US009302186B2

(12) United States Patent
Sterchi et al.

(10) Patent No.: US 9,302,186 B2
(45) Date of Patent: Apr. 5, 2016

(54) BASEBALL VIDEOGAME HAVING PITCHING METER, HERO MODE AND USER CUSTOMERIZATION FEATURES

(75) Inventors: Henry Sterchi, Redmond, WA (US); Jeff Miller, Redmond, WA (US)

(73) Assignee: Nintendo Co., Ltd., Kyoto (JP)

( * ) Notice: Subject to any disclaimer, the term of this patent is extended or adjusted under 35 U.S.C. 154(b) by 2081 days.

(21) Appl. No.: 11/077,211

(22) Filed: Mar. 11, 2005

(65) Prior Publication Data
US 2005/0153764 A1    Jul. 14, 2005

(51) Int. Cl.
A63F 9/24        (2006.01)
A63F 13/00       (2014.01)
A63F 13/63       (2014.01)
A63F 13/60       (2014.01)
A63F 13/40       (2014.01)

(52) U.S. Cl.
CPC ........... *A63F 13/63* (2014.09); *A63F 13/10* (2013.01); *A63F 13/60* (2014.09); *A63F 2300/303* (2013.01); *A63F 2300/638* (2013.01); *A63F 2300/64* (2013.01); *A63F 2300/646* (2013.01); *A63F 2300/8011* (2013.01)

(58) Field of Classification Search
CPC ......... A63F 13/60; A63F 13/61; A63F 13/63; A63F 13/65; A63F 13/655; A63F 13/69; A63F 2300/303; A63F 2300/60; A63F 2300/6009; A63F 2300/6018; A63F 2300/638; A63F 2300/64; A63F 2300/646; A63F 2300/8011
USPC .......................................................... 463/3
See application file for complete search history.

(56) References Cited

U.S. PATENT DOCUMENTS

| 4,467,412 A | 8/1984 | Hoff |
| 4,710,873 A * | 12/1987 | Breslow et al. ................. 463/31 |
| RE33,662 E | 8/1991 | Blair et al. |
| 5,149,104 A | 9/1992 | Edelstein |
| 5,411,259 A * | 5/1995 | Pearson ............... A63F 13/005 463/36 |
| 5,553,864 A | 9/1996 | Sitrick |
| 5,595,389 A | 1/1997 | Parulski et al. |
| 5,830,065 A | 11/1998 | Sitrick |
| 6,028,593 A | 2/2000 | Rosenberg et al. |
| 6,183,259 B1 | 2/2001 | Macri et al. |

(Continued)

FOREIGN PATENT DOCUMENTS

JP    2002-210239    1/2001

OTHER PUBLICATIONS

Lkanentl, International Superstar Soccer A football game with substance . . . Jun. 5, 2003 Last Accessed Jul. 2, 2015 <http://www.gamefaqs.com/gamecube/589589-international-superstar-soccer-3/reviews/review-54836>.*

*Primary Examiner* — Milap Shah
(74) *Attorney, Agent, or Firm* — Nixon & Vanderhye PC

(57) ABSTRACT

A sports videogame such as a baseball videogame allows a user to control the release time of a pitch in order to control the timing of a break on the pitched ball. Other implementations of a baseball videogame allow a user to put extra spin on a pitched ball to thereby create a greater break on the pitch or allow the user to play in a hero mode which enables the user to control a videogame character in a series of specific game play scenarios designed to allow the user to immediately control the videogame character to perform unique skills. Game play may also be customized by allowing the user to incorporate user-created images into screens of game play and/or allow the user to incorporate recorded audio messages into game play.

30 Claims, 22 Drawing Sheets

(56) References Cited

U.S. PATENT DOCUMENTS

| | | |
|---|---|---|
| 6,183,363 B1 | 2/2001 | Ishihara et al. |
| 6,183,367 B1 | 2/2001 | Kaji et al. |
| 6,257,983 B1 | 7/2001 | Rimoto |
| 6,270,413 B1 | 8/2001 | Aikawa et al. |
| 6,285,381 B1 | 9/2001 | Sawano et al. |
| 6,306,039 B1 | 10/2001 | Kaji et al. |
| 6,394,894 B1 | 5/2002 | Okitsu et al. |
| 6,425,825 B1 | 7/2002 | Sitrick |
| 6,677,967 B2 | 1/2004 | Sawano et al. |
| 6,994,626 B1 * | 2/2006 | D'Achard Van Enschut ............ A63F 13/10 463/31 |
| 2001/0003712 A1 | 6/2001 | Roelofs |
| 2001/0012798 A1 | 8/2001 | Nakayama |
| 2001/0024970 A1 | 9/2001 | McKee et al. |
| 2001/0044333 A1 | 11/2001 | Okishio et al. |
| 2002/0016194 A1 | 2/2002 | Namba et al. |
| 2002/0022516 A1 * | 2/2002 | Forden ............ A63F 13/10 463/32 |
| 2002/0034980 A1 | 3/2002 | Lemmons et al. |
| 2002/0040322 A1 * | 4/2002 | Ebisawa ............ A63F 13/12 705/14.49 |
| 2002/0082077 A1 | 6/2002 | Johnson et al. |
| 2002/0094852 A1 | 7/2002 | Fujioka et al. |
| 2002/0107058 A1 | 8/2002 | Namba et al. |
| 2002/0124182 A1 * | 9/2002 | Bacso et al. ............ 713/200 |
| 2002/0177477 A1 | 11/2002 | Okitsu et al. |
| 2002/0194590 A1 * | 12/2002 | Pong ............ 725/32 |
| 2003/0017863 A1 | 1/2003 | Takahashi et al. |
| 2003/0022710 A1 * | 1/2003 | DeMar ............ G07F 17/32 463/16 |
| 2003/0040349 A1 | 2/2003 | Imaeda et al. |
| 2003/0214518 A1 * | 11/2003 | Yamada et al. ............ 345/629 |
| 2004/0067788 A1 * | 4/2004 | Angelopoulos ......... A63F 13/10 463/1 |
| 2005/0031127 A1 * | 2/2005 | Gosior et al. ............ 381/2 |

* cited by examiner

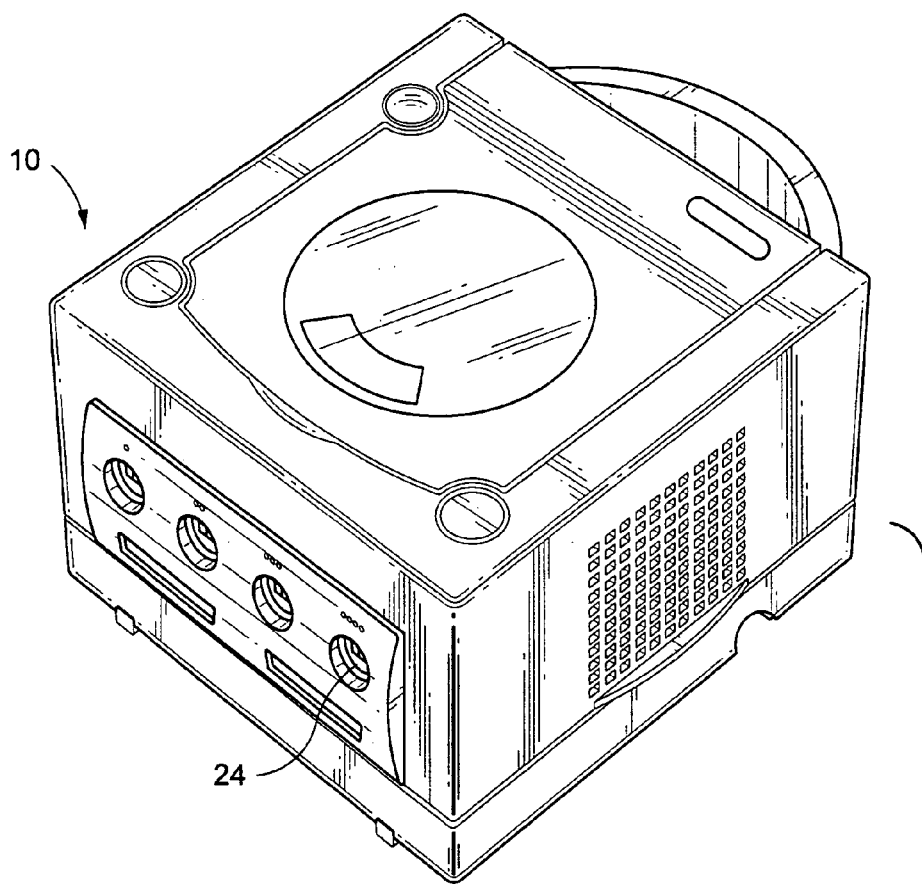
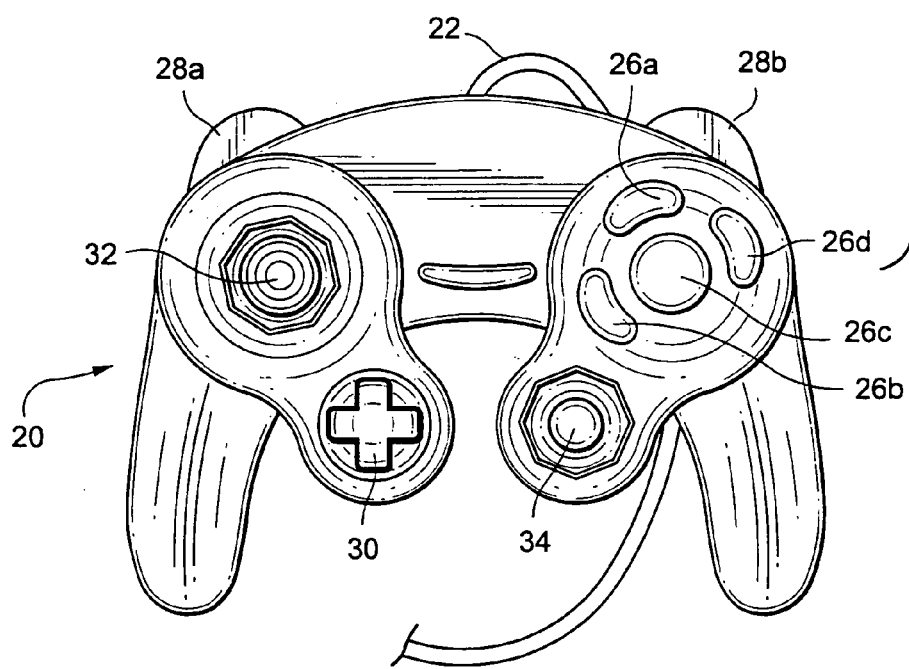
Fig. 1

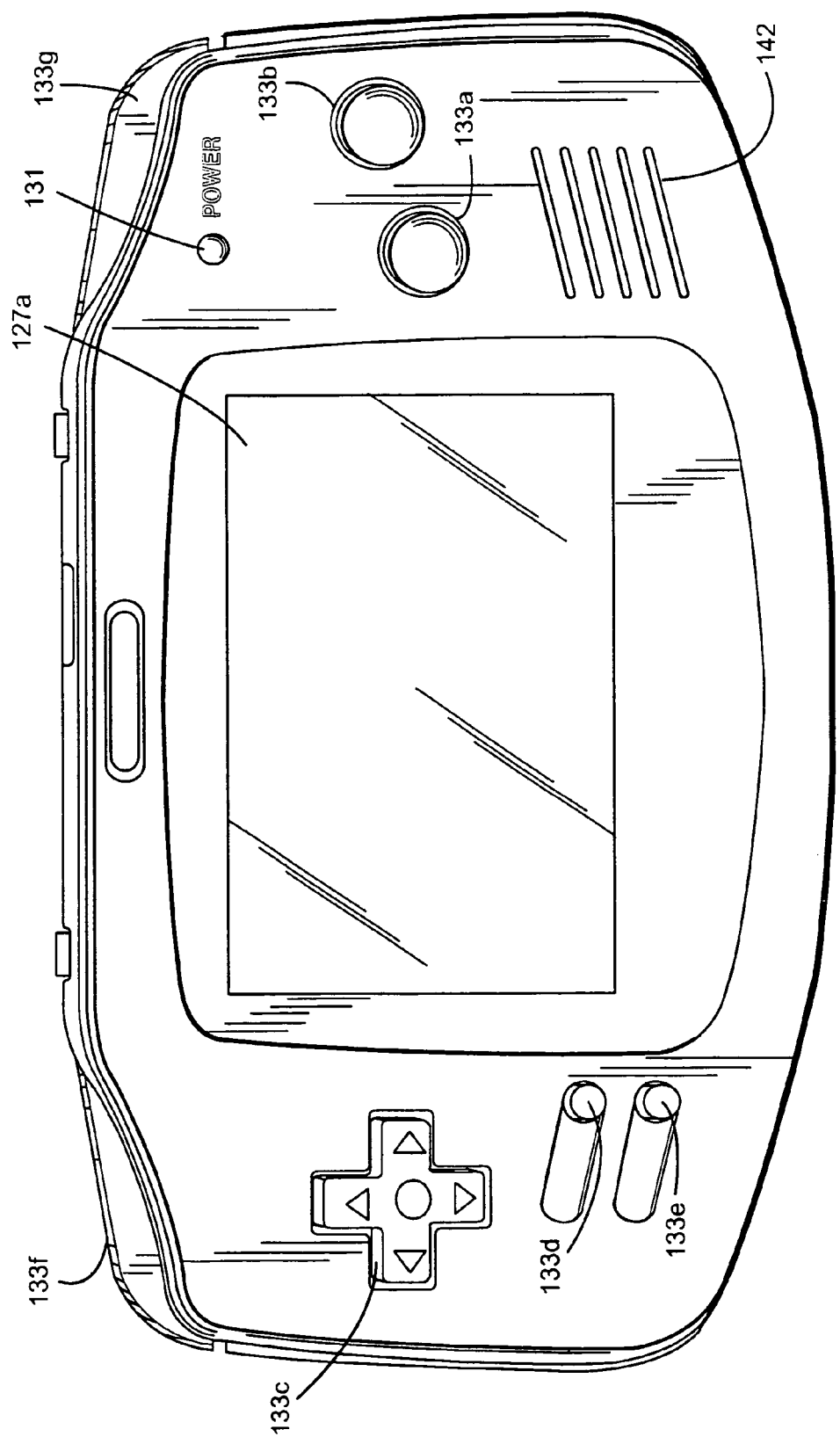

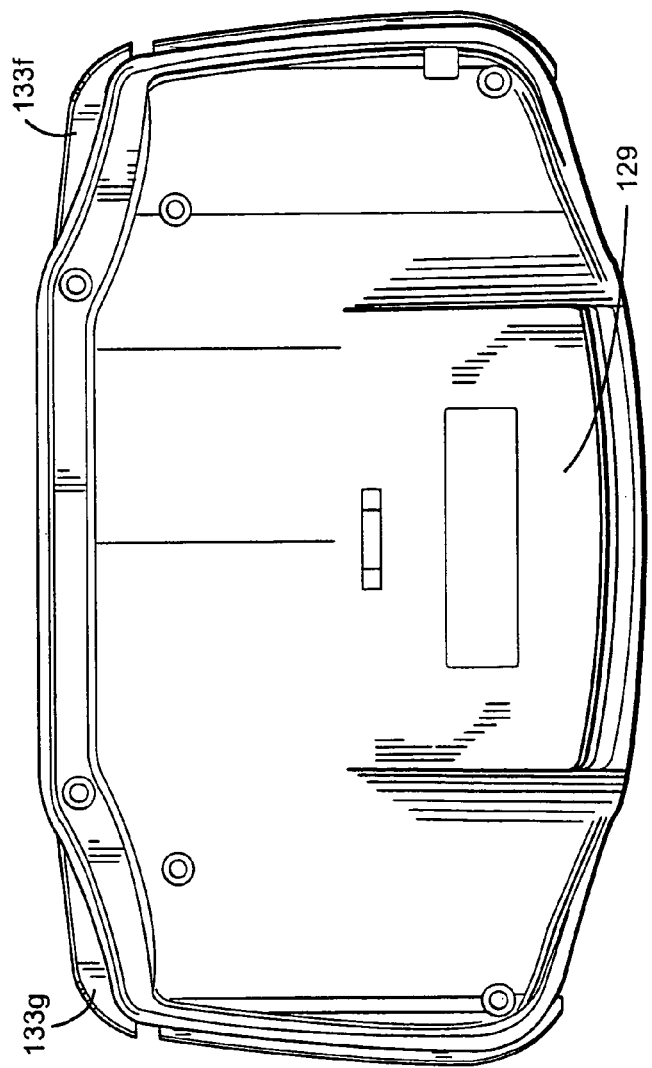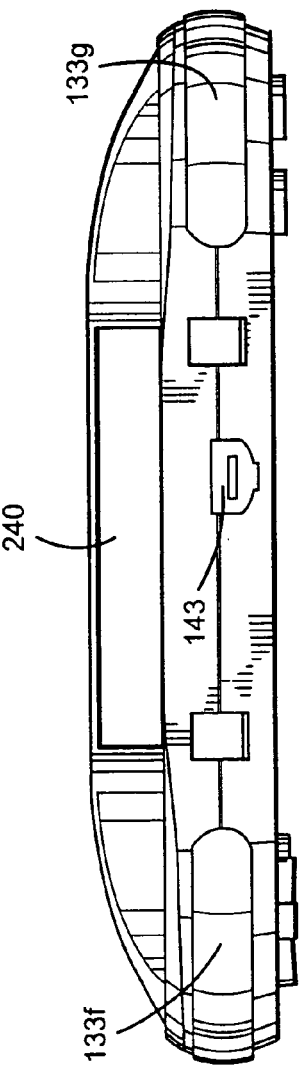

BASEBALL VIDEOGAME HAVING PITCHING METER, HERO MODE AND USER CUSTOMERIZATION FEATURES

CROSS REFERENCE TO RELATED APPLICATIONS

This application is a division of application Ser. No. 10/821,269, filed Apr. 9, 2004, which claims the benefit of U.S. Provisional Application Nos. 60/461,423 filed on Apr. 10, 2003, 60/493,799 filed on Aug. 11, 2003 and 60/537,910 filed on Jan. 22, 2004. The contents of each of application Ser. No. 10/821,269 and the above-identified provisional applications are incorporated herein by reference.

BACKGROUND AND SUMMARY

The technology herein relates to the field of sports videogames and, more particularly, to a baseball videogame which provides the user with greater options, flexibility, and customization of game play. For example, exemplary implementations allow the user to control the release time of the baseball from the pitcher's hand to initiate a pitch, thereby controlling the timing of a break (i.e., change in ball flight such as curve) on the pitched ball. Other exemplary implementations, additionally or alternatively, (i) allow the user to put extra spin on a pitched ball to thereby create a greater break on the pitch, (ii) allow the user to play in a "hero" mode which enables the user to control a videogame character in a series of specific game play scenarios, (iii) allow the user to incorporate user-generated images into screens showing game play, and (iv) allow the user to incorporate user-created audio messages such as audio messages having the user's voice into game play.

Sports videogames have been very successful and popular in the past. There are a variety of sports games that have been provided for use on videogame consoles, such as Nintendo's N64, Sega's Dreamcast, and Sony's Playstation2, to name just a few as well as the Gameboy Advance (GBA) portable game console. Numerous basketball, football, soccer, baseball and hockey games, as well as many other sports games, have been created for playing on videogame consoles. Due mainly to the major advancements in, graphics hardware over the years, these sports videogames have become very realistic and provide users of the games with an exciting and enjoyable experience that closely simulates real sports competition. The software behind these videogames has also become very sophisticated and facilitates many elements of real sports competition in order to provide the user with an experience that simulates real sports play as close as possible. For example, in baseball videogames, the player is provided with the ability to pitch, throw, hit, field, catch and perform many other simulated acts that a real-life baseball player would perform during an actual real-life game.

While prior videogames have very realistic game play, the industry is constantly striving to improve the games and provide even greater realistic and exciting experiences for the player. Constant improvements are needed in order to continue to satisfy the ever increasing demand for high quality and realistic sports videogames.

One way that baseball videogame developers have provided greater realism and exciting game play is to allow a videogame player to select a specific type of pitch (e.g., fastball, curveball, change-up, screwball) and its intended location. It would be beneficial, however, to allow a videogame player (i.e., user) to control the pitch beyond these parameters.

Exemplary implementations of the baseball videogame disclosed herein resolve this problem. In particular, exemplary implementations of the baseball videogame provide an improved pitching feature by allowing the videogame player to control the release time of a pitch (i.e., the point in time that the pitcher releases the (virtual) ball toward home plate as a pitch) and/or allowing the videogame player to put extra spin on a pitched ball in addition to allowing the user to select pitch type and intended pitch location. By allowing the videogame player to control the release time of a pitch, a timing of the break on a pitched ball may be controlled. For example, if the videogame player controls the pitcher so that the release time is too early, the break on the pitched ball will occur early in its flight thereby allowing the batter to better anticipate the ball's ultimate location in the hitting zone of the batter and make any necessary adjustments. The batter is thus more capable of hitting the pitched ball. By allowing the videogame player to put extra spin on a pitched ball, the amount of break on the pitched ball can be made greater and/or multidirectional. A videogame player thus has greater flexibility in controlling the parameters of the pitched ball, thereby increasing realism and excitement during game play.

In an exemplary implementation of a baseball videogame, wherein animated action is performed by a pitcher character in response to input by a user provided through a user-operable controller, a method of controlling game play comprises: monitoring for user input on the user-operable controller requesting release of a baseball pitch by the pitcher character, detecting when user input is requested on the user-operable controller requesting release of the baseball pitch by the pitcher character, comparing a time at which the user input is detected to an optimal pitch release timing, and controlling a timing of a break on the baseball pitch based on the comparison. The timing of the break on the baseball pitch may occur relatively early in its flight when the time at which the user input is detected occurs earlier than the optimal pitch release timing. The timing of the break on the baseball pitch may occur relatively late in its flight when the time at which the user input is detected occurs at or during the optimal pitch release timing. The timing of the break on the baseball pitch may result in the pitch being outside of a batter character's strike zone when the time at which the user input is detected occurs after the optimal pitch release timing. The optimal pitch release timing may be a period of time which varies based on the performance statistics of the pitcher character or the type of pitch selected by input on the user-operable controller.

In another exemplary implementation of a baseball videogame, wherein animated action is performed by a pitcher character in response to input by a user provided through a user-operable controller, a method of controlling game play comprises: receiving user input from the user-operable controller requesting a pitch by the pitcher character, the pitch having a certain amount of spin, monitoring user input from the user-operable controller requesting an additional amount of spin to be added on the pitch, and performing the pitch of a baseball from the pitcher character, the pitch having the certain amount of spin plus the additional amount of spin when the user input requesting an additional amount of spin has been received. The user input requesting an additional amount of spin may indicate the level of additional spin is to be added on the pitch. The user input requesting an additional amount of spin may be accomplished using a button on the user-operable controller as a control element for indicating the level of additional spin to be added on the pitch, the level of additional spin being directly related to a number times the button is pushed. One or more symbols may be displayed to indicate a level of additional spin to be added on the pitch. A fatigue level of the pitcher character may increase as a result of the pitcher character placing additional spin on a pitch.

Another way that baseball videogame developers have generated excitement and interest in sports videogames is to provide the user the option of playing in different game play modes. These different game play modes include, for example: (i) a season mode in which a user selects a desired team which competes against other teams in a simulated season with won-lost and player statistics being updated via play during the season, (ii) a franchise mode which places the user in the position of a team franchise general manager capable of trading and drafting players, and (iii) a tournament mode which allows a user to define a single elimination or round robin tournament between different teams and/or users. It would be beneficial, however, to allow a user to select from an even greater number of game play modes.

Exemplary implementations of a baseball videogame disclosed herein resolve this problem. In particular, exemplary implementations of the baseball videogame provide a hero mode as an option for selection by the user. The hero mode allows the user to select a particular videogame character which may, for example, possess a distinct set of unique skills similar to that of a particular real-life player. The hero mode provides a series of game play scenarios which allow the videogame player to control the videogame character immediately to perform at least one of the unique skills. The series of game play scenarios thus allows the videogame player to control the character to perform the corresponding real-life player's signature moves and abilities immediately instead of waiting to see if and when these scenarios would occur during normal game play. A camera view of the display screens may continually show a first person perspective of that particular videogame character or a perspective from immediately behind that of the particular videogame character. The results of the user's control of the videogame character to successfully complete the signature moves and/or abilities in game play can be scored and the scores accumulated over the set of game play scenarios.

In an exemplary implementation of a sports videogame, wherein animated action may be performed by a game character in response to input from a user provided through a user-operable controller and the game character possesses the characteristics of a real-life player having a plurality of unique skills, a method of controlling game play comprises: generating a first game play scenario presenting an opportunity for the user to control the game character to simulate performance of one of the unique skills of the real-life player, receiving user input from the user-operable controller to control the animated action of the game character in the first game play scenario, generating at least one additional game play scenario presenting an opportunity for the user to control the game character to simulate performance of another one of the unique skills of the real-life player, and receiving user input from the user-operable controller to control the animated action of the game character in the additional game play scenario. A score based on the user's control of the game character to achieve a certain goal presented by the first game play scenario and a score based on the user's control of the game character to achieve a certain goal presented by the additional game play scenario may be assigned and may be added to form an accumulated score. A determination may be made to determine whether the accumulated score exceeds a threshold value. The assigned scores may be separate scores from runs scored during normal game play in a baseball videogame. A display of game play during the game play scenarios may be shown which continually shows a perspective from a position behind the game character or continually shows a first person perspective of the game character. Sounds may be generated during game play in each of the game play scenarios that simulate what the game character would hear during virtual game play including audio instruction from a teammate character.

Another way that baseball videogame developers have provided greater realism and exciting game play is to provide visual and audio details of a sports venue such as a sports stadium or arena that simulate those in real-life. For example, many baseball videogames include music broadcast over a simulated public address system and pictures resembling real-life stadium billboards. It would be beneficial, however, to allow a user to customize visual and audio parameters of the sports venue. Exemplary implementations of the videogame disclosed herein resolve this problem. In particular, exemplary implementations of the baseball videogame provide the user with the opportunity to customize a sports venue by incorporating a recorded audio message such as a message having the user's voice into game play and/or incorporating user generated artwork into signs held by fans, venue billboards or banners, field patterns and/or motion picture screens.

In an exemplary implementation of a videogame system including a user-operable controller, a method comprises: allowing the user to create an image using the user-operable controller during execution of a software program, allowing the user to select a portion of a virtual sports venue in which interactive game play of a sports videogame is to be provided, applying the created image onto the selected portion of the sports venue, displaying the sports venue having the applied created image so that the created image contributes to the overall atmosphere in which interactive game play of the sports videogame is provided, and providing interactive game play of the sports videogame within the sports venue in response to input received on the user-operable controller. The portion of the virtual sports venue onto which the user created image is applied may be one of the following: a billboard, a sign, a playing surface pattern and a motion picture screen. The image may be created by editing a preexisting image which is loaded into the videogame system. The preexisting image may be loaded by reading data printed on a card with a card reader which may be connected to the user-operable controller. The user may be allowed to preview the created image, before application onto the selected portion of the sports venue, on a display screen of the user-operable controller. Applying the created image onto the portion of the sports venue may include processing the created image to covert the created image into a texture and texture mapping the texture onto the selected portion of the sports venue. The portion of the sports venue onto which the created image is applied may be animated to simulate a moving picture. The execution of the software program may be accomplished at least in part by a processor arranged within the controller.

In another exemplary implementation of a videogame system including a user-operable controller, a method of allowing a user to incorporate a user generated audio message into game play of a videogame comprises: receiving and storing an audio message from the user, detecting input from the user-operable controller indicating a particular event that may occur in game play of the videogame, and playing the stored audio message during game play of the videogame if and when the particular event in game play occurs. A menu screen may be displayed listing a plurality of game play events so that the detected input from the user-operable controller indicating the particular event is a selection of one of the game play events listed on the menu screen. The audio message from the user may be received through a microphone such as a microphone connected to the user-operable controller. Receipt and storage of the audio message and detection of the input indicating a particular event in game play may be completed before interactive game play of the videogame begins.

BRIEF DESCRIPTION OF THE DRAWINGS

These and other features, objects and advantages will be better understood from review of the following detailed description when read in conjunction with the following drawings, in which:

FIG. 1 shows an exemplary game console for use in playing videogames and a game controller for enabling a user to control operation of the game.

FIG. 2A-2E shows a portable game system GBA which may be used as a controller to the game console illustrated in FIG. 1.

FIG. 11 also shows an alternative pitch in dashed lines having a normal amount of spin and thus a lesser amount of break.

DETAILED DESCRIPTION OF EXEMPLARY NON-LIMITING ILLUSTRATIVE IMPLEMENTATIONS

Figure 2E:
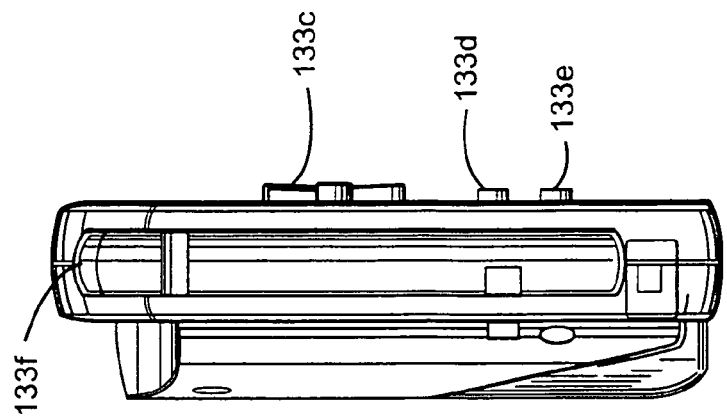
Figure 2D:
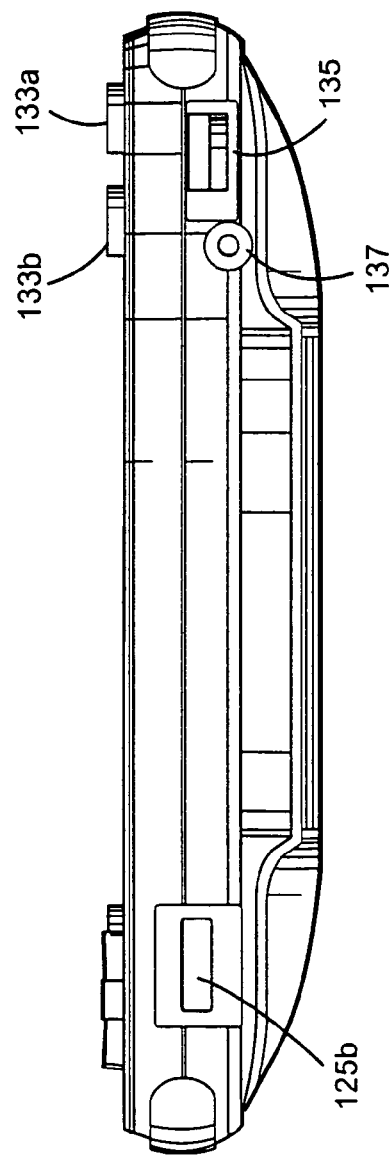

Exemplary illustrative non-limiting implementations will now be described with reference to the drawings. FIG. 1 shows a videogame console 10 that can be used to run videogames. While the NINTENDO GAMECUBE (GCN) videogame console is shown in FIG. 1, the exemplary illustrative non-limiting implementations can include any suitable game or other platform capable of running videogames such as sports videogames, including for example PC based games incorporating a game controller. The internal hardware of the GCN videogame console is described in U.S. Pat. No. 6,606,689 to Cheng et al, the content of which is incorporated herein by reference. In the videogame console 10 of FIG. 1, a memory medium, such as a CD or DVD, is used to store videogame software. The software containing disk or other storage medium is placed in the console for controlling the operation thereof and enabling a desired game to be played on the console. The console preferably includes a graphics co-processor in addition to the central processing unit (CPU) in order to enable fast action games to be played and displayed in a very realistic and exciting manner. The console is typically connected to a display device, such as a television.

The videogame console is also provided with a game controller 20 for use by the user in controlling the game by providing input to the console 10 through selective operation of the buttons and other control elements on the controller 20. The controller 20 may be connected by wire 22 to the console 10 via the connection port 24, although a wireless connection or any other operable connection may be used. The controller 20 includes several different buttons that provide various corresponding signals to the videogame console for use by the game software to control the game in accordance therewith. More particularly, the exemplary controller 20 of FIG. 1 includes a cluster of four digital buttons 26a-26d, two analog buttons 28a and 28b, a joypad 30, a first analog joystick 32 and a second analog joystick 34, as well as other control elements, such as a start/stop button. One or more of the buttons, joypad or joysticks may be operated by the user used to implement user customization features or control game play, as will be explained in detail below. The connection port 24 may be connectable to other devices such as a microphone to receive audio signals such as the user's voice. The connection to the microphone may be made through a wire, although a wireless communication microphone may be used.

The exemplary implementations have particular applicability to sports videogames in which several (or at least two) different actions can be taken in a given situation. Such games include but are not limited to basketball, baseball, soccer, football and hockey. The exemplary illustrative non-limiting game software implementation is programmed to respond to signals from the controller 20, such that operation of one or more of the buttons or switches dictates the user's customization of the videogame. The buttons and/or switches also operate in a conventional manner to control game play as one skilled in the art will readily understand.

FIGS. 2A-2E are a front perspective view, a rear perspective view, a top-down view, a bottom-up view and a side view, respectively, of an example portable game system GBA. The internal GBA hardware is described in U.S. Patent Application Publication 2001/0047452 to Okada et al, published Nov. 29, 2001, the content of which is incorporated herein by reference. The GBA can be used to play interactive videogames with accompanying sound. It can also be used for a variety of other applications including, but not limited to, an address book, a calculator, a date book, and an e-mail application. Video is displayed on display 127a and the sound is output through speaker 142. Display 127a may, for example, be a reflection (non-backlit) TFT color LCD. Display 127a may also, if desired, be implemented as a touch-sensitive screen. The volume is adjustable by a volume control 135 and headphones (not shown) may be connected to the GBA via a headphone jack 137. An interface 143 is used for interfacing with, for example, other portable game systems; console game systems such as the GCN (see FIG. 3) connected to televisions or other display devices; external devices such as infrared communication circuits, modems, adapters, bar code readers, wireless telephones microphones and the like.

The GBA is powered by batteries (not shown) contained in a battery compartment accessible via a removable compartment cover 129. Power indicator 131 dims as the batteries lose power to provide a visual indication that new batteries are needed. In an alternative implementation, the GBA may also be configured for connection to an AC adapter to permit play without batteries.

To play a videogame (or use some other application), the user selects an appropriate storage medium storing the videogame (or application) he or she wants to play (or use), and inserts that storage medium into a slot 240 in the GBA. The storage medium may, for example, be in the form of a cartridge housing a memory that stores the game program or application. Such memory is typically semiconductor memory, although optical and magnetic memories are also usable. Alternatively, all or a portion of a videogame program may be downloaded to the GBA from a game console such as the GCN through link cable 201 and interface 143. The GBA can be used as a controller for another game console such as the GCN. If a GBA is used as a controller to a videogame executed by the GCN, information provided on display 127a of a particular GBA may be viewable only by the user operating the GBA while information displayed by the television connected to the GCN is viewable by all users.

The user operates a power switch 125b to turn on the GBA and cause the GBA to begin running the videogame or application based on the program stored in the storage medium or downloaded from a game console via interface 143. Of course, it is also possible to provide electrical power from the GCN if the GBA is connected to the GCN or to provide some games and/or applications in on-board memory of the GBA. Such games and applications may be accessible without inserting a storage medium into slot 240.

Operating keys 133a-133g are used to provide inputs to the GBA. These inputs may be transmitted to the GCN via link cable 201. Operating keys 133a and 133b are used, for example, to cause various motions and actions of the game characters (i.e., game players) displayed on LCD 127a. These motions and actions include equipment (e.g., baseball bat) use, a jump and the like. Operating key 133c is used to move a game character displayed on LCD 127a in four directions, e.g., upward, downward, right and left. Operating key 133d is a select key that is used, for example, for game mode selection and the like. Operating key 133e is a start key that is used to start playing a game or to temporarily stop the progress of a game. The GBA is also provided with left and right shoulder buttons 133f and 133g for supplying operating signals. When a player holds the GBA during game play, operating keys 133a and 133b are accessible by the thumb of the right hand, operating key 133c is accessible by the thumb of the left hand, left shoulder button 133f is accessible by the index finger of the left hand and right shoulder button 133g is accessible by the index finger of the right hand. In this way, a user may supply a variety of inputs to the GBA. Depending upon the particular game or application, the various operating keys 133a-133g can perform different functions at different times.

Other input devices may be used with the GBA. For example, if display 127a is implemented as a touch-sensitive screen, a stylus may be used to supply inputs. Various other input devices may also be connected to the GBA via interface 143 or cartridge slot 240. For example, an infrared communication device may be connected to interface 143 to permit communication with other similarly equipped devices. A modem or network interface may be connected to the GBA via interface 143 or via cartridge slot 240 to permit connection to the Internet. A digital camera may be connected to the GBA via cartridge slot 240 to input captured images. A microphone may be connected to the GBA via cartridge slot 240 or via interface 143 to input audio signals such as the user's voice.

When a game cartridge is inserted into cartridge slot 240, the GBA automatically detects the cartridge type and switches to an appropriate operation mode. More specifically, the GBA includes a connector that, in use, is operatively connected to a portable storage media (e.g., game cartridges) storing game programs or other applications. The example GBA includes first processing circuitry for processing programs having a first program specification (e.g., an 8-bit specification) and second processing circuitry for processing programs having a second program specification (e.g., 32-bit specification). The automatic detection of cartridge type may, for example, be based on a physical characteristic of the portable storage medium (e.g., shape of cartridge housing) or may be based on data stored in the portable storage medium.

While the exemplary implementations are described with reference to a hand-held game system, many of the concepts are applicable to other computing systems such as personal digital assistants (PDAs). For example, it may be desirable to configure a PDA to be compatible with a wide range of accessories, not all of which conform to the same specifications. By using the cartridge type detection techniques described herein and/or by providing first and second processing circuitry as described herein, the number and type of accessories that may be used with the PDA may be increased.

Figure 3:
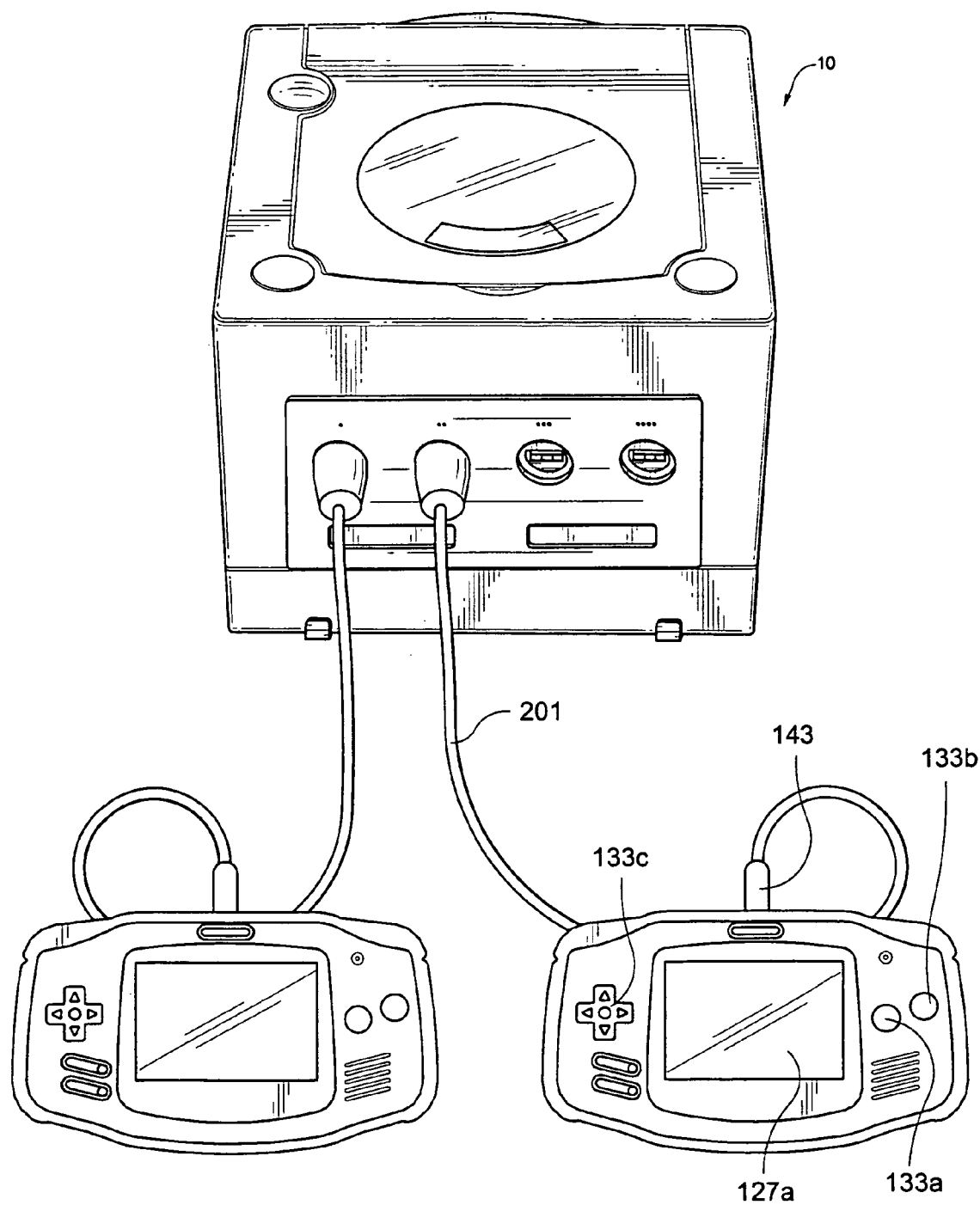
FIG. 3 shows the portable game system GBA connected as a controller to the game console illustrated in FIG. 1.

A videogame being executed by console 10 may be controlled by a videogame player(s) via one or more controllers 20 (see FIG. 1) and/or one or more of GBA controllers (see FIG. 3). In accordance with an exemplary implementation, the videogame player(s) can play a baseball videogame as illustrated by the (i) method shown in the flow diagram of FIG. 4 and corresponding screen shots of FIGS. 5-8, (ii) method shown in the flow diagram of FIG. 9 and corresponding screen shots of FIGS. 10-11 and/or (iii) method shown in flow diagram of FIG. 12 and corresponding screen shots of FIGS. 13-16.

FIGS. 4-8 describe a baseball videogame in accordance with an exemplary implementation which allows a videogame player to control the release time of a pitch thrown by a pitcher. A videogame player may activate control of the release time as a game play parameter by manipulating an appropriate button, switch and/or joystick on the controller (controller 20 or GBA controller). Controller output generated from the player's manipulation is received by the videogame to activate control of the pitch release time as a game play parameter prior to actual game play (step 302 of FIG. 4). Alternatively, control of the pitch release time may be activated as a game play parameter by default during initial booting of the videogame.

Figure 4:
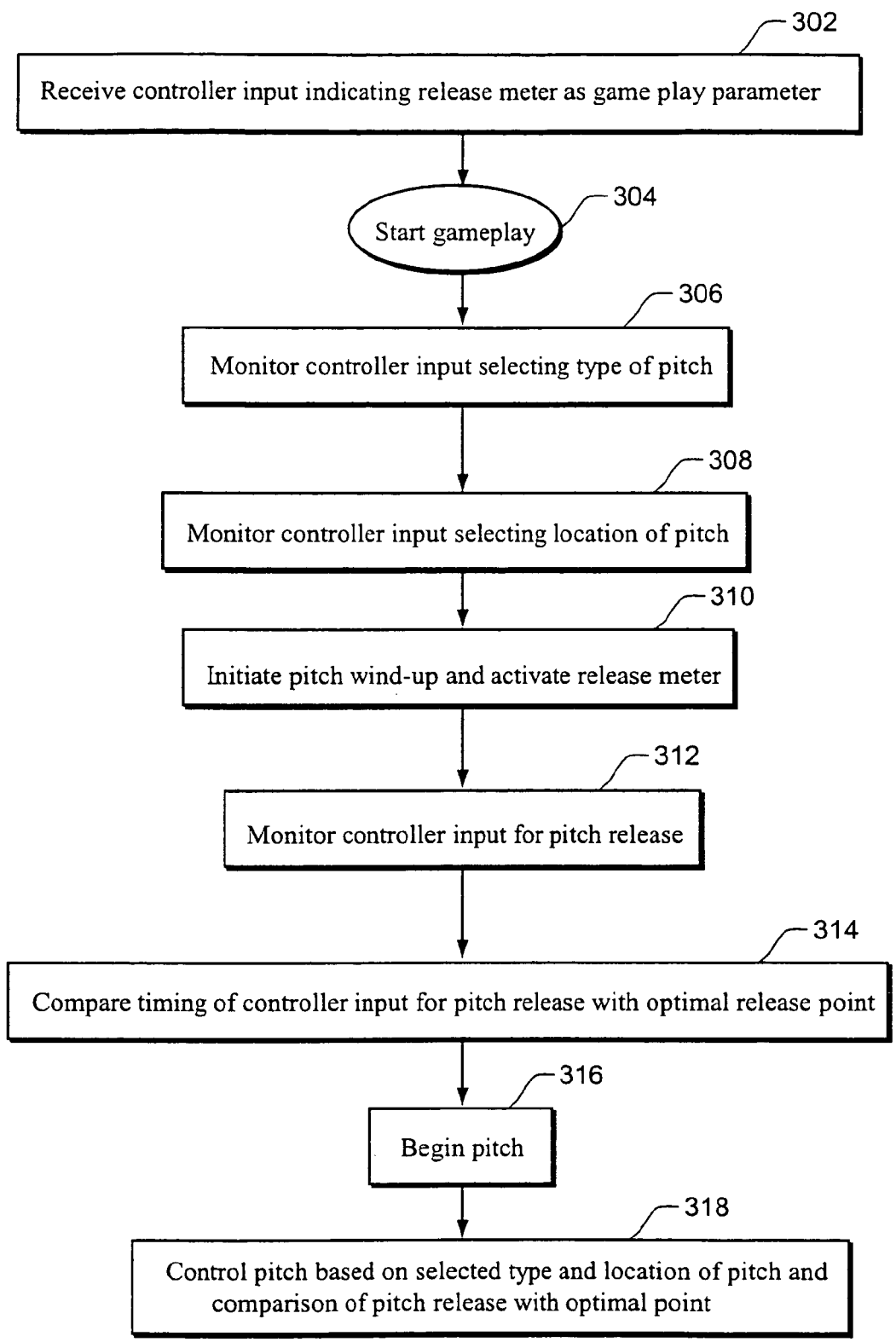
FIG. 4 is a flow diagram illustrating a method of a baseball videogame which includes the use of a release meter for controlling pitches in accordance with an exemplary non-limiting illustrative implementation. The baseball videogame may be executed by any of the game systems illustrated in FIGS. 1-4.
Figure 5:
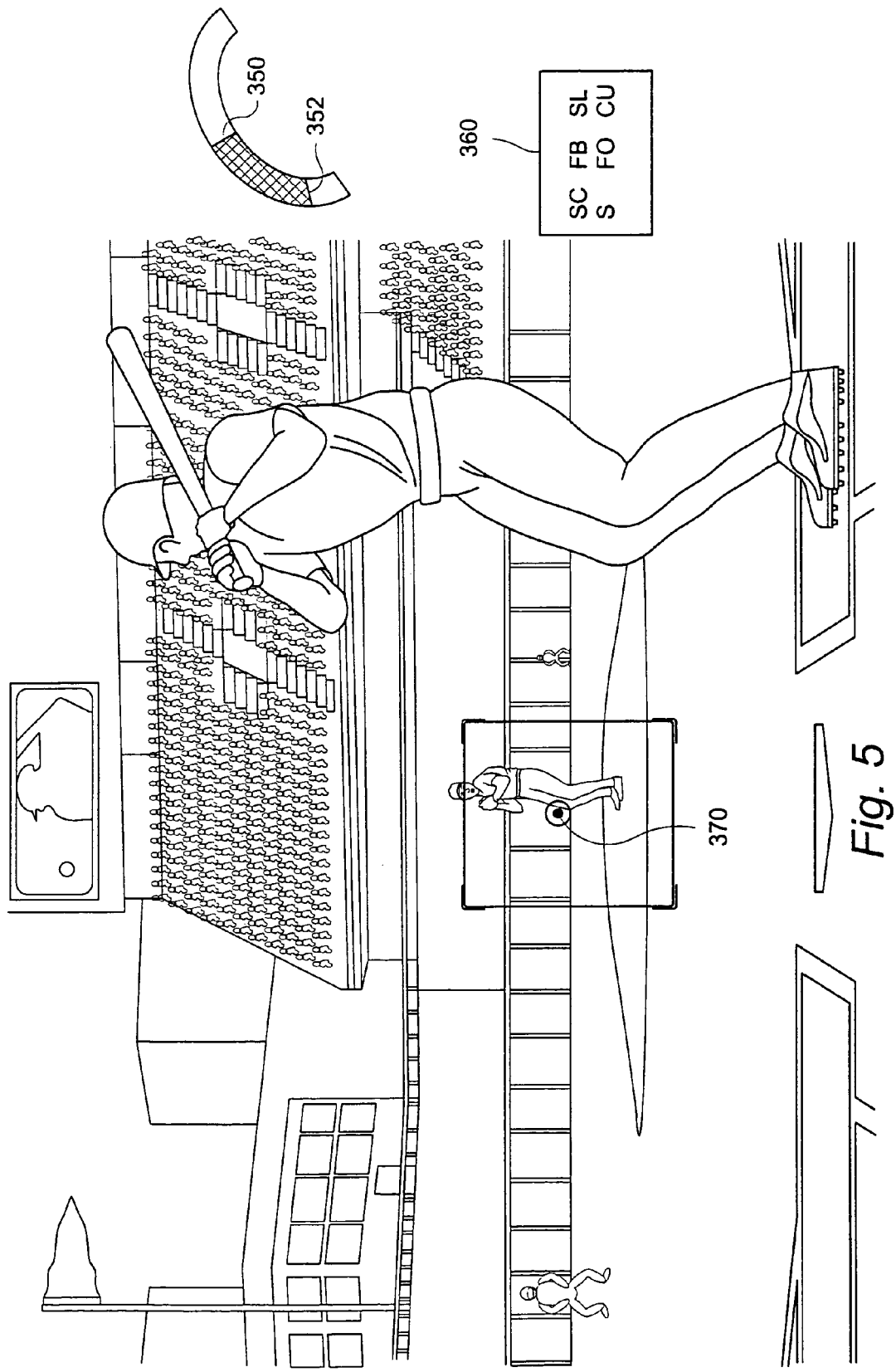
FIG. 5 is a screen shot of an exemplary non-limiting illustrative baseball videogame showing planning of a pitch to be thrown by a pitcher.

After game play starts (step 304), the videogame generates and displays the screen illustrated in FIG. 4. This screen includes a release meter 350, a pitch selection menu 360 and a cursor 370. The videogame then monitors for controller input from the videogame player controlling the pitcher. In particular, the videogame monitors for controller input indicating a selected pitch type and intended pitch location (steps 306 and 308).

A player selects a particular type of pitch (e.g., fastball, curveball, change-up, screwball, etc.) through pitch selection menu 360. For example, a fastball may be selected by a player by manipulating the controller to highlight "FB" on the pitch selection menu 360 and then pressing a button to select "FB". Alternatively, each type of pitch denoted by the abbreviations shown in pitch selection menu 360 may be assigned to a different button and/or joystick direction of the controller. A user may select the desired pitch type by selecting the appropriate button or moving the joystick in the appropriate direction. In this manner, the type of pitch can remain hidden from the videogame player controlling the batter.

In addition to the pitch type, a player controlling the pitcher selects an intended location for the pitch. The intended pitch location may be in or out of the strike zone of the batter. A player may select an intended pitch location by moving cursor 370 through joystick manipulation and then selecting the appropriate controller button once the cursor is in the desired pitch location.

After the pitch location and pitch type are selected, the player initiates wind up of a pitch (step 310) by pressing and holding down an appropriate button on the controller. Alternatively, the pitcher's wind up may be initiated by pressing and releasing an appropriate button on the controller or automatically upon the selection of the button designating the intended pitch location. A release meter 350 begins to run down at the same time that the pitcher's wind up begins.

Figure 6:
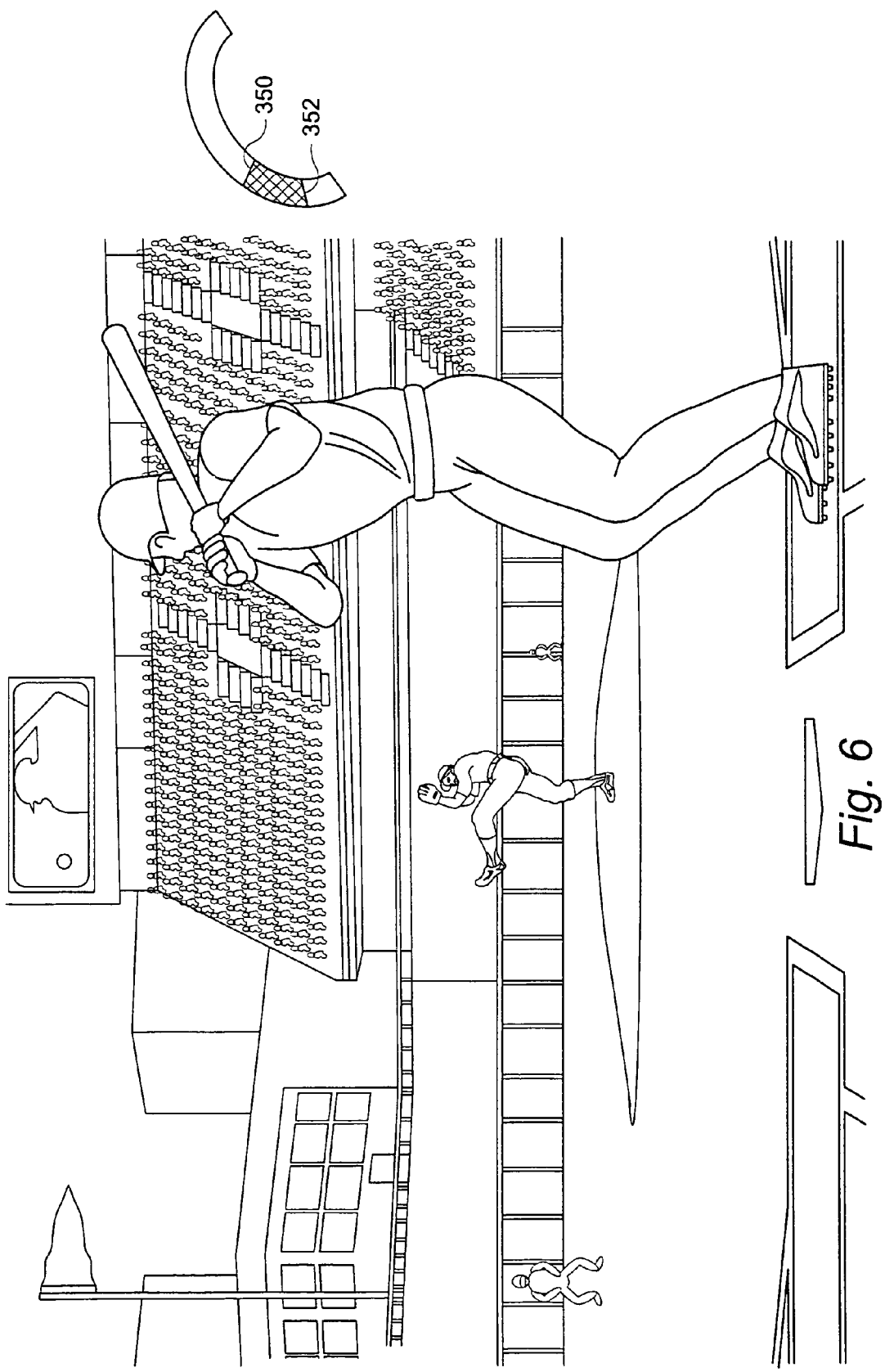
FIG. 6 is a screen shot of the exemplary non-limiting illustrative baseball videogame showing the pitcher's wind up and concurrent execution of the release meter.

FIG. 6 illustrates game play soon after the pitcher's wind up has begun. Since some time (albeit a small amount) has passed since the wind up began, release meter 350 has diminished from its original position (compare release meter 350 shown in FIGS. 5 and 6). Release meter 350 thus continues to move toward release target line 352 which corresponds to the optimal release time of the pitch from the pitcher. During the wind up of the pitcher, the player continues to hold down the button pressed to initiate the pitcher's wind up. During the wind up, the videogame monitors for controller input (release of the pressed button) to release the pitch (step 312).

A goal of the player controlling the pitcher is to release the button at the exact point in time that release meter 350 crosses release target line 352. By releasing the button at exactly the point in time that release meter 350 crosses release target line 352, the player will successfully direct the pitcher to release the ball at the optimal release time. If, however, the player releases the button before or after the exact point in time that release meter 350 crosses release target line 352, the pitcher will release the ball at a non-optimal release time, thereby adversely affecting the pitch.

In real-life baseball, if a pitcher releases the ball for a pitch before its optimal release time, then any break in the pitch's ball flight will occur at a relatively early point in its flight. That is, if the pitcher releases the ball for a pitch too early, any break in the pitch's ball flight will typically occur at a position well ahead of the batter. The batter can clearly see what is happening to the ball's flight and thus more accurately judge its ultimate position when it reaches the hitting zone of the batter. The batter thus has a greater chance of hitting the ball. On the other hand, if a pitcher releases the ball for a pitch at an optimal release point, then any break in the pitch's ball flight will typically occur later in the flight and thus much closer to the batter. For example, a ball released by a pitcher at the optimal release point will break just before reaching the hitting zone of the batter. If this happens, the batter will likely not have time to correctly judge or adjust to the ball's changing flight and will thus be less likely to determine its ultimate position when reaching the hitting zone. A batter is therefore less likely to hit the ball. Accordingly, a late break is to the pitcher's advantage because the ball's change in movement occurs closer to the batter, thereby limiting the batter's opportunity to correctly judge, adjust (if necessary) and hit the ball. An early break in the ball's flight is to the batter's advantage because it allows the batter to see the break, correctly judge and adjust (if necessary) to it. If the pitcher releases the ball after the optimal release point, a mis-pitch (i.e., a wild pitch or pitch clearly outside of the batter's strike zone) usually results.

Figure 7:
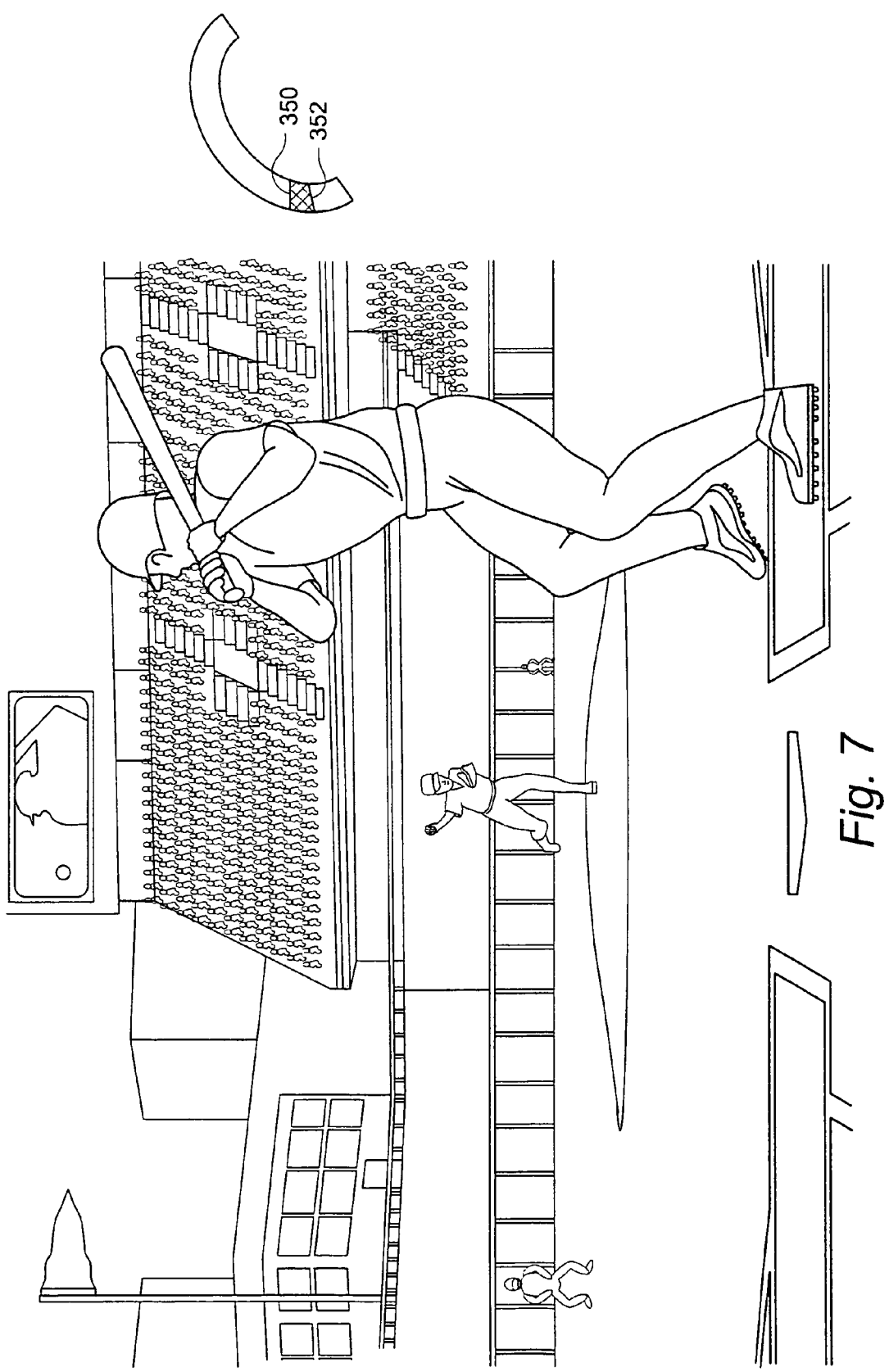
FIG. 7 is a screen shot of the exemplary non-limiting illustrative baseball videogame showing the pitcher as he releases the pitched ball toward the hitting zone of the batter and concurrent execution of the release meter.

FIG. 7 illustrates game play of the videogame at the time the videogame pitcher releases the ball (step 316). As discussed above, the player directs the pitcher to release the ball by releasing the button depressed to begin the pitcher's windup. The time that the button is released is compared to release target line 352 (step 314). In the example illustrated in FIG. 7, the videogame player has released the button before the release meter 350 has crossed the release target line 352. This will direct the pitcher to release the ball before its optimal release point. If the videogame player had released the button at the same time release meter 350 crossed release target line 352, the pitcher would have released the ball at the optimal release point.

Figure 8:
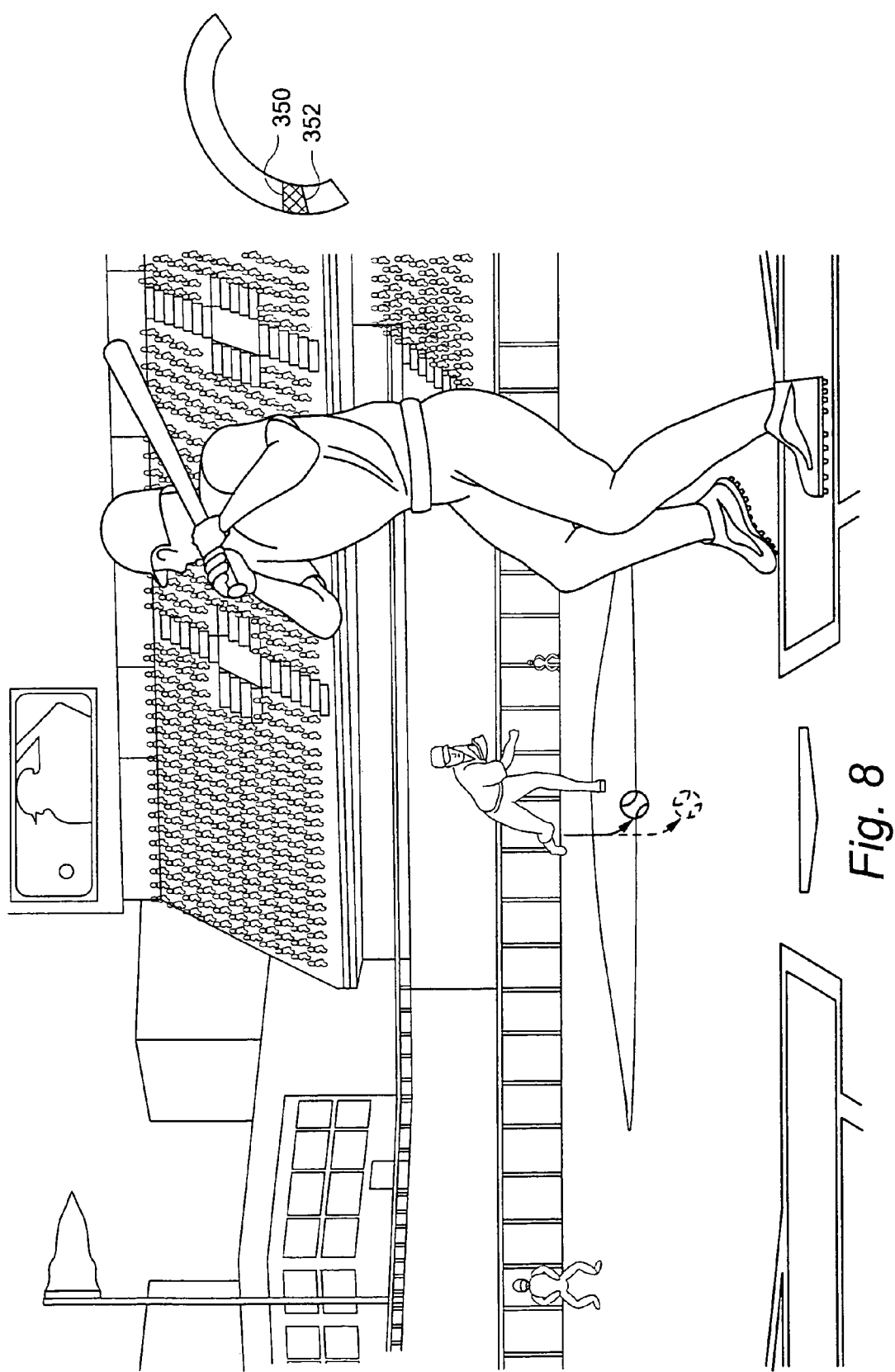
FIG. 8 is a screen shot of the exemplary non-limiting illustrative baseball videogame showing a pitch having an early break. The screen shot also shows an alternative pitch in dashed lines having a later break.

FIG. 8 illustrates game play of videogame after the pitch is released by the pitcher. The flight of the pitch is based on the (i) selected pitch type, (ii) intended location and (iii) timing of the pitch release with respect to the optimal release point (step 318). Because the pitcher released the ball before the optimal release point as illustrated in FIG. 7 (due to the player releasing the button initiating the pitch wind up at a time when release meter 350 had not yet reached release target line 352), the pitch illustrated in FIG. 8 has a flight path having a relatively early break. The batter, in real-life and correspondingly in the videogame simulating the batter, will therefore have a better chance of hitting the ball. If the player had released the button initiating pitch wind up at the precise time that the release meter crossed release target line 352, then the pitch would have had a later break such as that illustrated in dashed line in FIG. 8. The pitch having a later break is more difficult for the batter to hit in real-life and correspondingly is more difficult for the batter in the videogame to hit. If the pitcher released the ball after the optimal release point (due to the player releasing the button initiating the pitch wind up after release meter has passed release target line 352), the pitch will likely be a mis-pitch such as a wild pitch or a pitch obviously out of the batter's strike zone.

As another example, assume that the pitch type and intended location selected by a player is a low sinker. Assume also that it takes 60 frames of videogame play for a pitched ball to travel from a pitcher's hand to the batter's hitting zone. If the player controlling the pitcher releases the button initiating the pitcher's wind up too early as illustrated for example, in FIG. 7, the sinker will break relatively early, e.g., 15 frames after the pitched ball leaves the pitcher's hand. This early breaking ball will likely bounce early into the ground or be a pitch clearly outside the batter's strike zone. If, on the other hand, the player controlling the pitcher releases the button precisely at the time that release meter 350 crosses release target line 352, the sinker will begin to drop at, for example, 45 frames after the baseball leaves the pitcher's hand. The sinker would likely undercut right in front of the batter, thus minimizing the batter's chance to adjust to the ball and his ability to hit it. If the pitcher releases the ball after the point in time at which release meter 350 crosses target release line 352, a pitch outside of the strike zone will likely result.

Other factors such as the real-life performance statistics of the pitcher being simulated by the videogame pitcher may also affect the flight of the pitch. For example, if the real-life pitcher being simulated by the videogame pitcher possesses performance statistics indicating that he regularly releases the ball at the optimal release point or typically throws late breaking pitches, release target line 352 can be widened to form a target zone so that it will be easier for the videogame player to release the controller button to initiate pitch release as release meter 350 is within that particular target zone 352. The release target line 352 can also be widened (or narrowed) in accordance with the type of pitch, the pitch type having the easiest optimal release point having the widest release target zone. Since the target is a relatively wider zone, rather than a target line, the videogame player will be more likely to release the button at the appropriate time, thereby enhancing the chances that the videogame pitcher simulating the real-life pitcher will release the ball at the optimal time and thus enhancing the chances of a late-breaking pitch.

The above exemplary implementation describes a method of pitching in which a player initiates pitcher wind up by pressing and holding a particular button and releasing the button to enable the pitcher to release the pitch. However, other alternatives are possible. For example, the player could alternatively initiate the pitcher's wind up by pressing and immediately releasing a particular button. This button could be, for example, the button selecting the pitch location. This operation would begin the pitcher's wind up and allow the release meter 350 to simultaneously run down toward the release target line 352. The videogame would then monitor for the player to again press the button, with the ideal goal for the player being the selection of the button at the time that release meter 350 crosses target release line 352 to thereby initiate a pitch which is released by the videogame pitcher at the optimal release point.

Figure 9:
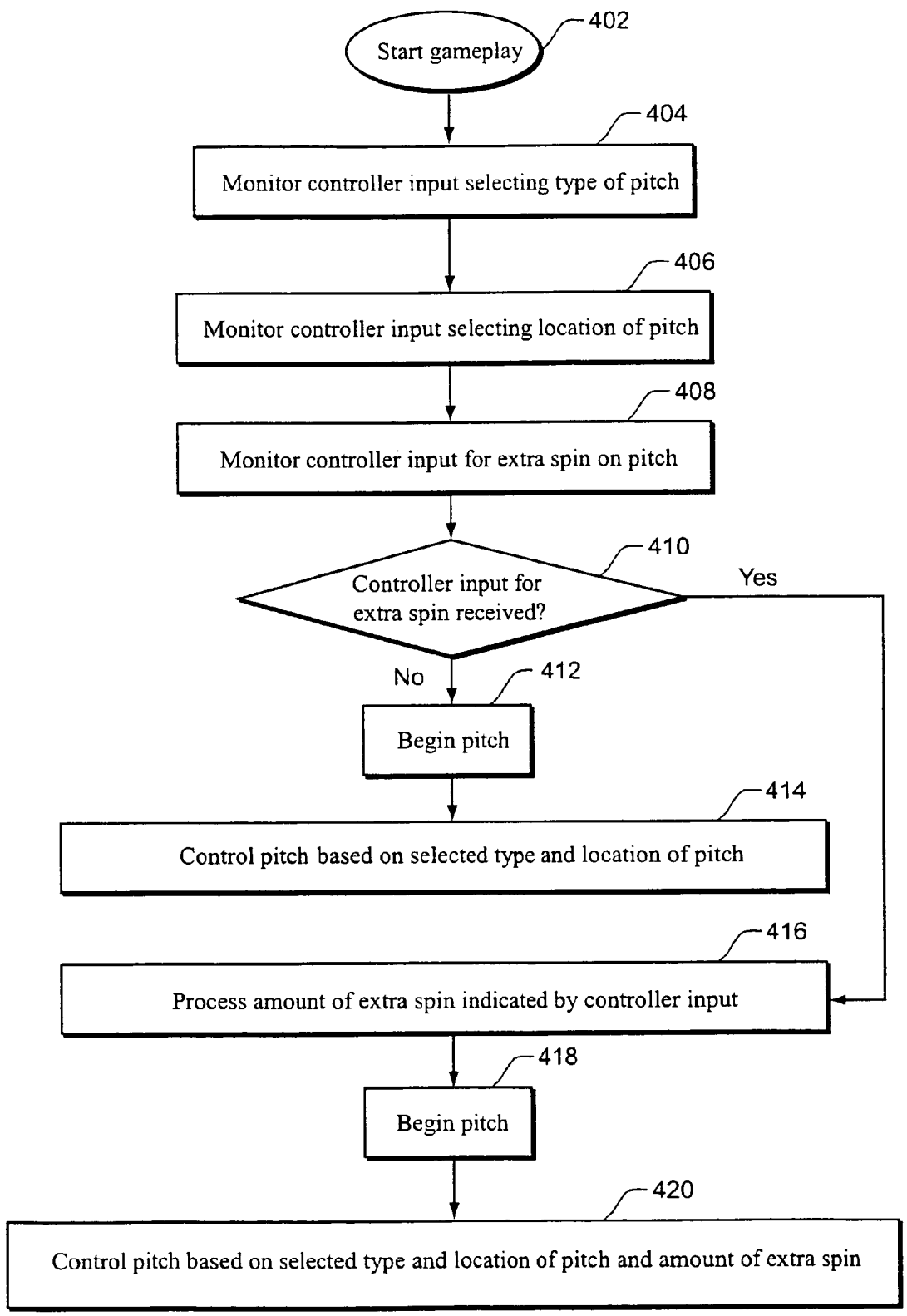
FIG. 9 is a flow diagram illustrating an exemplary non-limiting illustrative method of a baseball videogame in which a videogame player operates a controller to place extra spin on a pitch in accordance with another exemplary implementation. The baseball videogame may be executed by any of the game systems illustrated in FIGS. 1-4.
Figure 10:
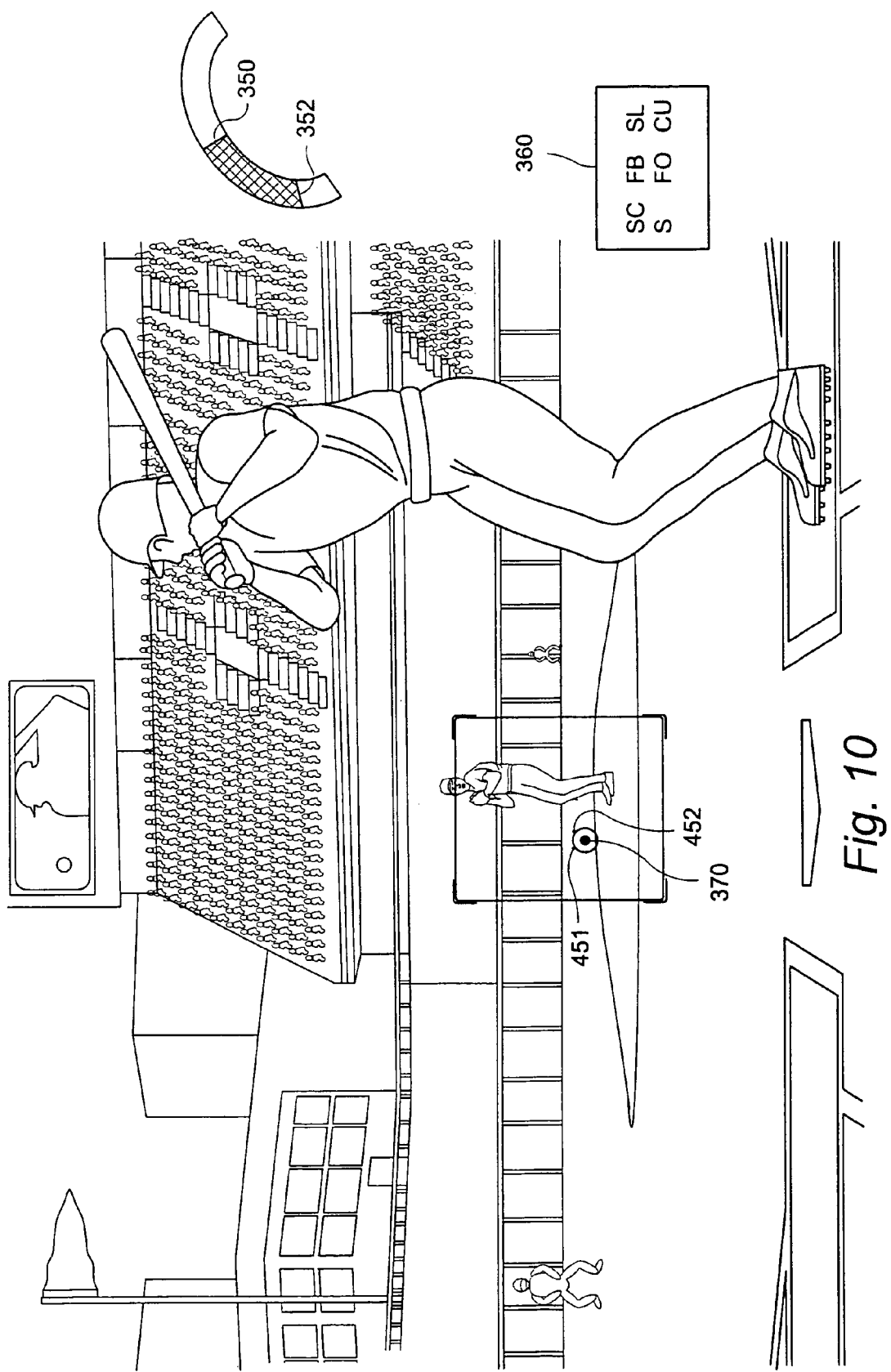
FIG. 10 is a screen shot of an exemplary non-limiting illustrative baseball videogame in which a pitch to be thrown is being planned, including the indication that extra spin is to be placed on the forthcoming pitch.
Figure 11:
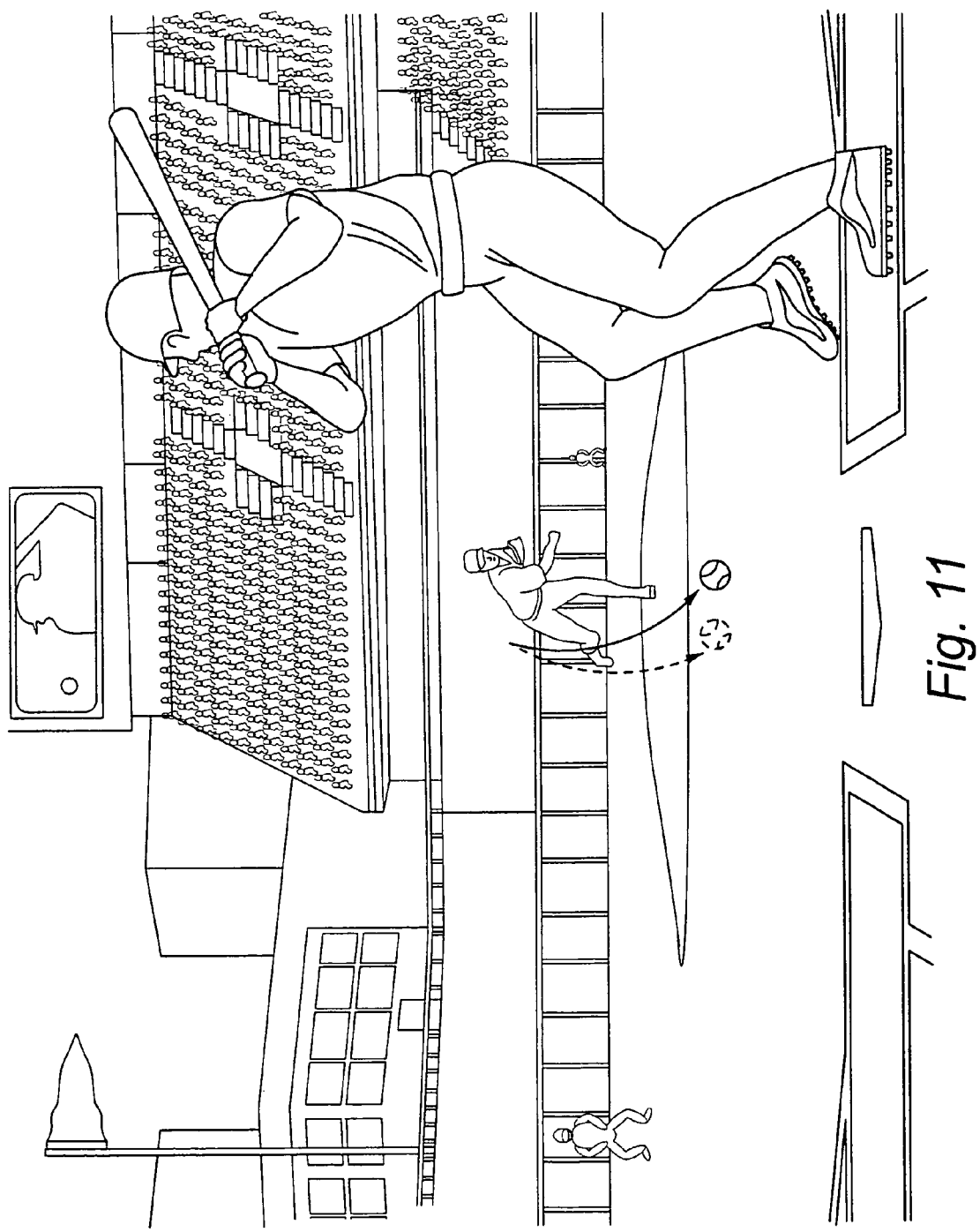
FIG. 11 is a screen shot of the exemplary non-limiting illustrative baseball videogame in which a pitched ball has an extra amount of spin.

FIG. 9 illustrates a method performed by a baseball videogame when executed by a videogame system in accordance with another exemplary implementation. FIGS. 10-11 illustrate exemplary screen shots of game play corresponding to various steps illustrated in FIG. 9. In particular, FIGS. 9-11 describe a baseball videogame which allows a videogame player controlling the pitcher to place extra spin on a pitch. In addition to selecting the type of pitch and the pitch location, the player has the additional option of placing extra spin on the pitch, thereby enhancing game play by giving the player greater pitching options. A player may thus select a curve ball to be thrown by the pitcher having a "regular" amount of spin and thus having a "regular" amount of break.

The player now has the option of placing additional spin on the curveball, thereby creating a greater amount of break on the ball's path. The player is thus capable of not only directing the videogame pitcher to throw curveballs, but different types of curveballs (i.e., curveballs having different amounts of spin and thus different amounts of break on the curve). Extra spin may be placed on other pitch types.

After game play is started (step 402), the videogame monitors for controller input selecting the type of pitch and the location of the pitch (steps 404 and 406) in a manner similar to that discussed above for steps 306 and 308, respectively. For example, a player may select a particular type of pitch via a pitch menu and select a particular location of pitch via a cursor as discussed above.

The videogame also monitors for controller input indicating that the player would like to place extra spin on the upcoming pitch (step 408). If no controller input is received ("NO" in step 410), the wind up and later release of the pitch can be initiated (step 412) with control of the pitch's flight being based on the selected type and intended location of the pitch (step 414). The pitcher's path may also be based on the release point of the pitch as discussed above in connection with FIGS. 4-8.

The player can indicate his/her desire to place additional spin on the next pitch by manipulating the controller in an appropriate manner ("YES" in step 410). For example, extra spin may be assigned to the "c" joystick 34 of controller 20 or assigned to a particular button. The amount of extra spin to be placed on the forthcoming pitch may be determined by the number of times that the player manipulates the appropriate controller input. For example, if the extra spin feature is triggered by the pressing of a particular button, the user may press that button multiple times to indicate that a greater amount of extra spin should be placed on the forthcoming pitch. For the discussion below, it will be assumed that the extra spin is assigned to a particular controller button.

FIG. 10 illustrates game play of a baseball videogame which allows the player controlling the pitcher to place extra spin on a forthcoming pitch. Before the pitch is thrown, the player selects the pitch type and location of pitch through pitch type selection menu 360 and cursor 370, respectively. If the user presses the appropriate controller button assigned to the extra spin feature once, then a symbol 451 will be shown above cursor 370 indicating that the player wishes to place extra spin on the forthcoming pitch. If the player presses the same button again, the videogame generates and displays an additional symbol 452 indicating an even greater amount of extra spin is to be placed on the forthcoming pitch.

While the player controlling the batter may see symbols 451 and 452 indicating that extra spin is to be placed on the forthcoming pitch, the player controlling the batter might not know the pitch type. This may allow the player operating the pitcher to fool the player controlling the batter as to the type of pitch, thereby enhancing exciting game play. For example, if the player controlling the batter sees more than one symbol 451 displayed on the screen as illustrated in FIG. 10, the player controlling the batter may be fooled into thinking that the pitcher is about to throw a curveball in order to take advantage of the increased amount of break on the pitched ball. However, the actual selected pitch may be a fastball or another type of pitch having less spin altogether and thus less break than a curveball even with the extra spin.

The videogame processes any extra amount of spin indicated by the controller input from the player controlling the pitcher (step 416) and initiates the pitch (step 418). The flight of the pitch is thus based on the selected pitch type, intended location of pitch and amount of extra spin selected by the player (step 420). The flight of the pitch may also be based additionally on the release point of the pitch as described in connection with FIGS. 4-8.

FIG. 11 shows a curveball pitch having an extra amount of spin. As shown in FIG. 11, the extra spin placed on the curveball allows the break of the curveball to be greater than the break of a curveball having no extra spin (i.e., only a "regular" amount of spin) as illustrated by the baseball depicted in dashed lines. Placing extra spin on a particular pitch may increase the fatigue level of the pitcher.

While the above exemplary features describe in the context of a baseball videogame, the exemplary features can be implemented in any suitable sports videogame, such as, but not limited to, basketball, soccer, hockey and football. For example, it is often necessary to place extra spin on a ball kicked by a videogame soccer character to curve the ball into the goal. Extra spin may be placed on the kicked ball in a similar manner as discussed above.

Figure 12:
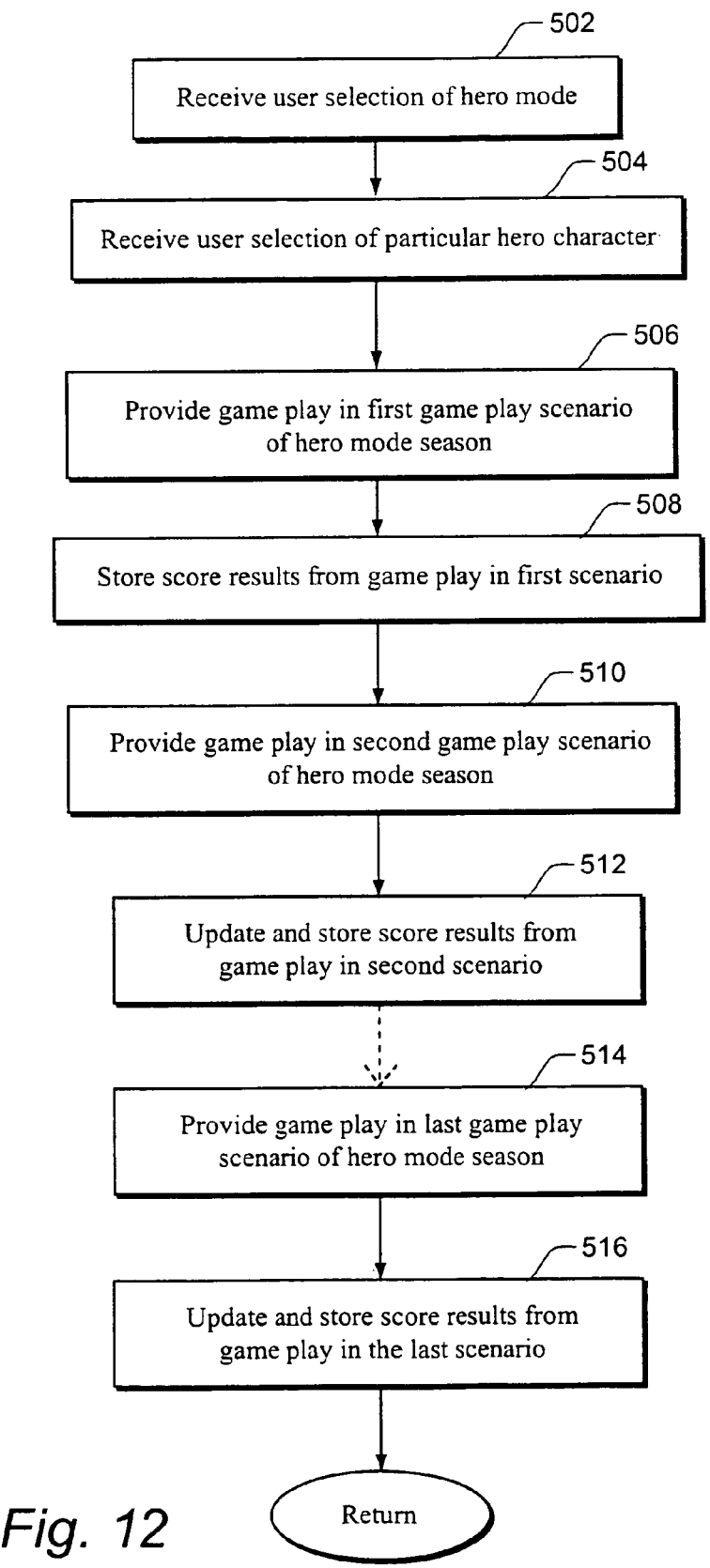
FIG. 12 is a flow diagram illustrating a method of a sports videogame which includes a hero mode of game play in accordance with another exemplary non-limiting illustrative implementation. This method of the sports videogame may be executed, for example, by any of the game systems illustrated in FIGS. 1-4.

In accordance with another exemplary non-limiting implementation, videogame player(s) can play a "hero" mode of a sports videogame such as a baseball videogame as illustrated by the method in the flow diagram of FIG. 12 and corresponding exemplary screen shots of FIGS. 13-16. Each of FIGS. 13-16 shows a camera angle perspective from behind a videogame "hero" character who is capable of simulating the unique signature skills of a specific real-life baseball player when faced with certain game play scenarios. A videogame player may thus select a character corresponding to his/her favorite real-life baseball player and play the game from a perspective which closely simulates that of the real-life player. For example, since the camera angle of the display screens shown in FIGS. 13-16 continually originates from a location behind the hero character, the display screens closely simulate what a real-life player might see with his/her own eyes in similar game play circumstances. Alternatively, the camera angle may continually show a first person perspective of the hero character.

Execution of the hero mode provides a series of specific game play scenarios. The entire series of game play scenarios forms a hero mode season which will be less than the number of games required for a typical season. For example, while a baseball season in a season mode of play will involve 162 games, the number of game play scenarios in a hero mode season will typically involve less than 162 game play scenarios. The usual lengthy baseball season is therefore shortened to place the selected hero character automatically in a "highlight" series of specific game play scenarios which will allow the videogame player to control the hero character to simulate that corresponding real-life player's signature skills. The specific game play scenarios chosen for game play in the hero mode season are therefore based on the specific traits of a particular player and will change when a different hero character is selected by the user. A videogame player may thus select a hero character corresponding to a particular real-life player to immediately be presented with a series of different game play scenarios in which the real-life player is known to perform one of his/her unique skills rather than waiting until when, if at all, the game play scenario actually occurs during regular game play. How successful the videogame player is at controlling the hero character to perform the unique skill is scored. This scoring may be accumulated with each scenario and compared to a threshold level to determine if the player has controlled the hero character in such a manner to enable him/her to become the MVP of the league. This scoring is separate from the runs scored during normal game play of the baseball game. A game within the baseball game thus results.

In each of these game play scenarios, the camera angle of the display screen will continually be positioned as if the camera were behind the hero character. Alternatively, the display screen can show the first person perspective of the hero character. The display screen will thus show what is in the field of view of the hero character and will thus simulate closely what the real-life player might see in that same set of real-life game play circumstances.

The sound generated by the videogame will also reflect the circumstances from the perspective of the hero character. The output sound will thus simulate what would be heard by the real-life player corresponding to the hero character in that specific set of circumstances and what the hero character would hear in his virtual world. For example, if the hero character is running closer toward another particular teammate such as a first base coach, the sound of those spoken instructions from the teammate will become louder as the hero character moves closer and closer to the teammate. Other sounds may include, for example, fan noise, dialog and/or taunting from opposing players, and a "skidding" sound against the ground when the hero character slides. Both the audio and visual output of the videogame will thus continually be from the perspective of the hero character. That is, the sounds output from the speakers of the output devices connected to the videogame system reflect what the hero character hears and the display screens continually show a visual perspective from behind the hero character or continually shows a first person perspective of the hero character. The videogame player may therefore realistically experience what the corresponding real-life player might experience in a similar real-life game play scenario.

Referring to FIG. 12, a user may first manipulate a controller to select game play within the hero mode (step 502), and then select a particular hero character (step 504) from a menu screen listing a plurality of possible hero characters. Each of these hero characters corresponds to a particular real-life baseball player having his/her own distinct set of unique skills (i.e., signature moves and/or abilities that distinguish this particular baseball player from all others). A videogame player may thus select a hero character corresponding to his/her favorite real-life baseball player and hear and view game play from a perspective which closely simulates that of the player. Since each of the hero characters possesses the characteristics of a corresponding real-life player, each hero character possesses a distinct set of unique skills. This distinct set of unique skills differs from one hero character to the next.

Upon execution, the videogame generates a series of game play scenarios forming a hero mode season. Which of the possible game play scenarios forms part of the hero mode season is based on the selected hero character. That is, each series of game play scenarios forming a hero mode season will differ from one hero character to another hero character. Again, each of the game play scenarios is designed to allow a videogame player to control a hero character to simulate a corresponding real-life player's unique skills.

Suppose for example that a particular real-life player is a short stop who is well known and highly regarded for stealing bases and turning double plays. If a hero character corresponding to this particular real-life player is selected by the videogame player, at least one game play scenario in the hero mode season will immediately place the hero character in a position where he attempts to steal a base. Another game play scenario in the series of game play scenarios forming the hero mode season will immediately place the hero character in the position of fielding a hit ball in an attempt to turn a double play. Each of these scenarios might not come up at all during normal game play of the videogame, thereby depriving the videogame player of the opportunity of controlling a character corresponding to his/her favorite real-life player to perform his/her unique skills. Other unique skill challenges prompted by specific game play scenarios may include, for example, bunts, in-field hits, hitting a home run, and hitting sacrifice fly balls.

As a result of the videogame player's selection of a particular hero character, a first specific game play scenario is automatically uploaded to provide game play to allow the user to control the hero character to simulate performance of one of the unique skills of the real-life player (step 506). The game play scenario may involve circumstances other than the usual start of the sport being simulated. For example, a first baseball game play scenario does not necessarily begin within a first pitch as in a normal baseball game.

Figure 13:
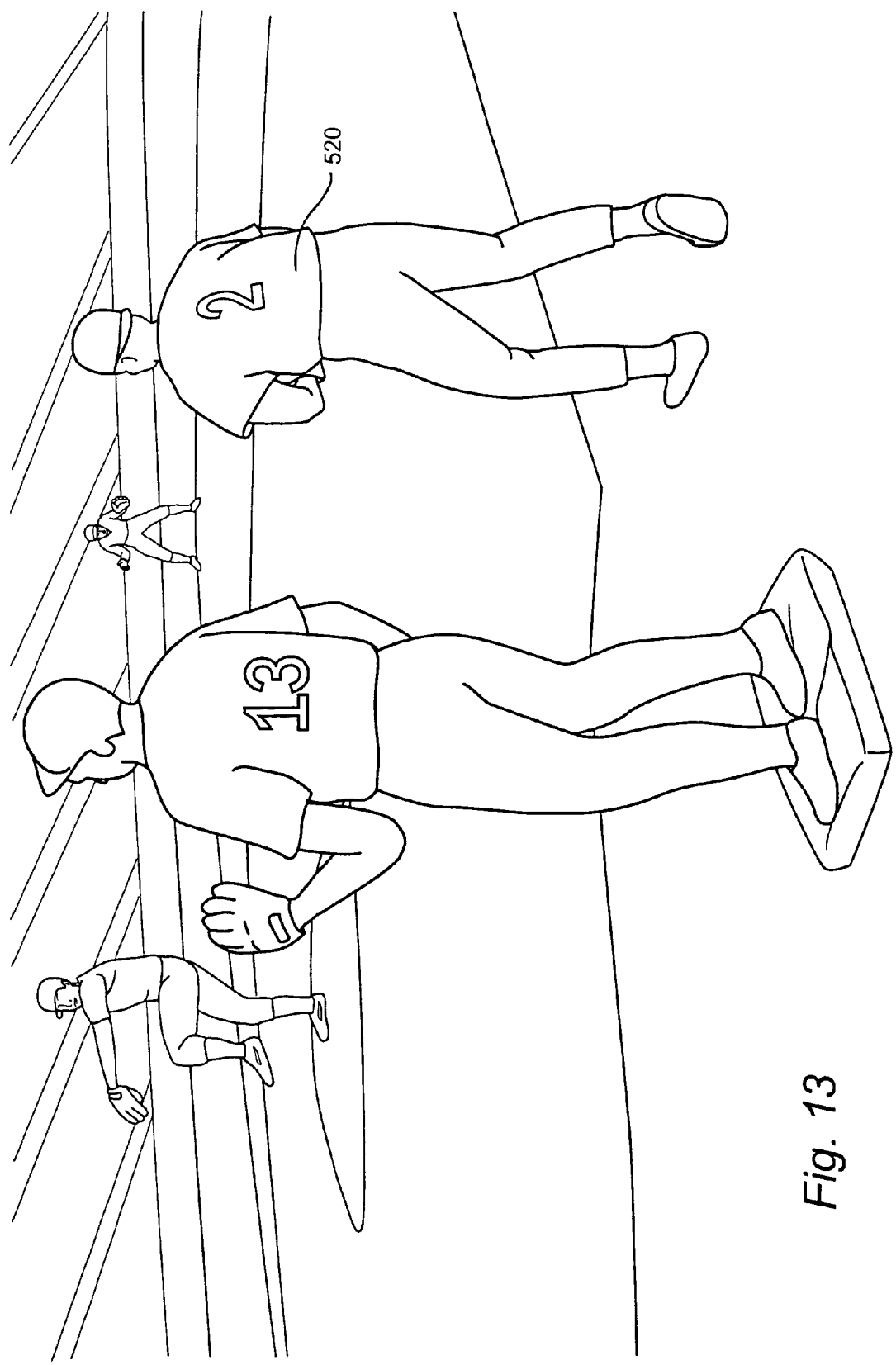
FIG. 13 is a screen shot of an exemplary non-limiting illustrative baseball videogame showing a hero videogame character leading from first base as part of a first game play scenario in a hero mode season.
Figure 14:
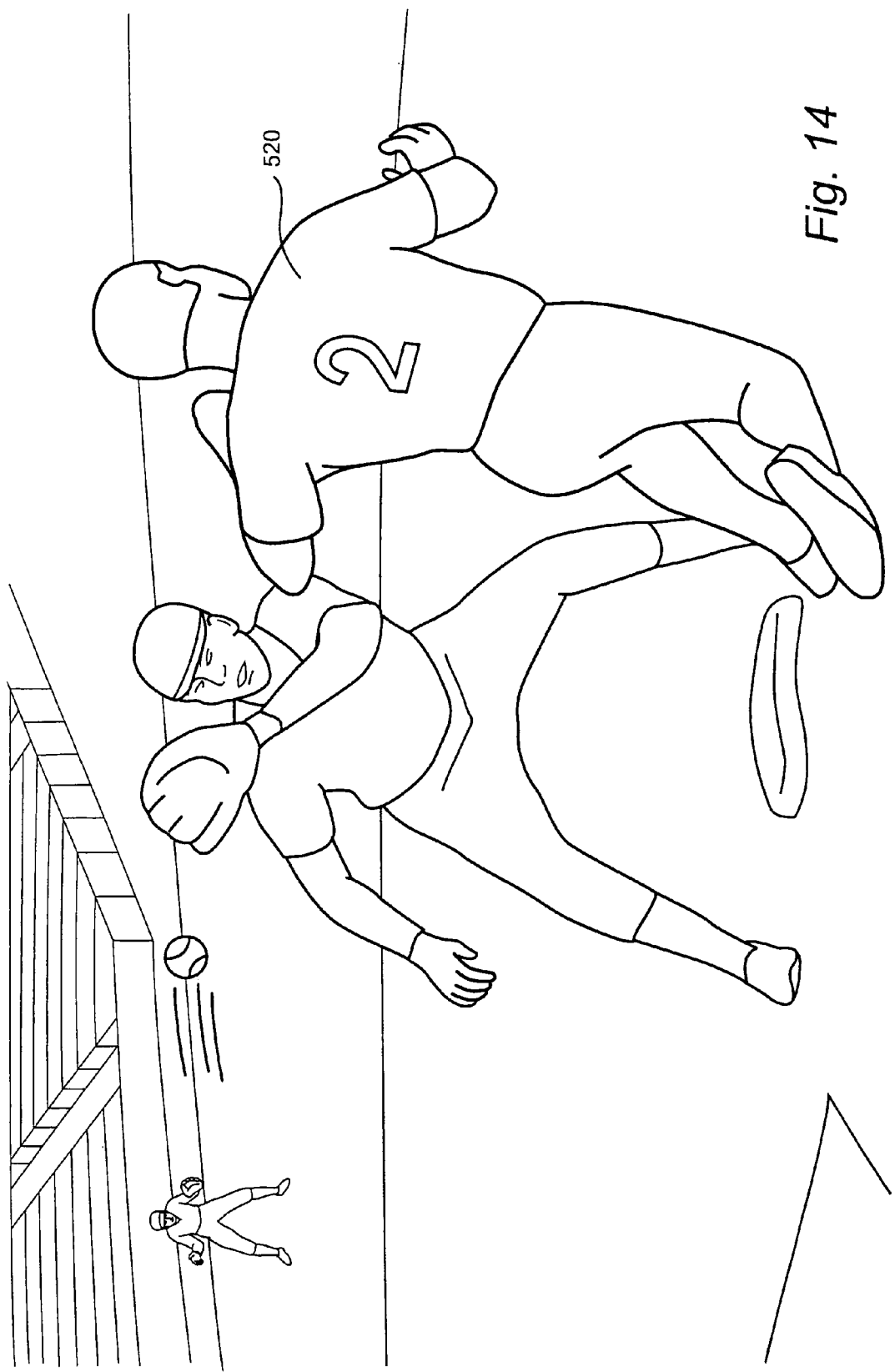
FIG. 14 is a screen shot of an exemplary non-limiting illustrative baseball videogame showing the hero videogame character attempting to steal second base as part of the first game play scenario of the hero mode season.

FIGS. 13-14 illustrate an exemplary game play scenario. In this particular game play scenario, the hero character 520 is put in a set of circumstances in which he/she is a base runner on first base who would like to steal second base. The videogame player is therefore immediately provided the game play scenario to enjoy controlling the videogame character's ability to perform a unique skill (in this case, stealing second base) of the corresponding real-life player. The camera angle view shown in the display screen of FIG. 13 is from a perspective behind hero character 520. Alternatively, the camera angle view can be that of a first person perspective of hero character 520 in which case the back of hero character 520 would not actually be seen in the display screen. As the hero character moves, the objects in view change. As illustrated in FIG. 14, for example, the appearance of second base and the second baseman covering second base will become larger on the screen as hero character 520 approaches second base. While the objects in view may change, the perspective of the camera angle remains the same. That is, the perspective shown in the display screen remains the perspective originating behind hero character 520 or a first person perspective of hero character 520.

The sound output continually reflects what would be heard by the hero character in his virtual environment. For example, while hero character 520 is leading from first base as shown in FIG. 13, the speakers can output spoken instructions from the nearby first base coach (not shown in FIG. 13) and/or comments from the nearby first baseman of the opposing team.

Scoring will be assigned by the videogame to reflect how successful the videogame player was in controlling hero character 520 to complete a goal presented by the game play scenario. For example, if a videogame player controlling hero character 520 in the game play scenario of FIGS. 13-14 fails to control hero character 520 to successfully steal second base, the videogame player will be awarded no points. In contrast, if the videogame player controls hero character 520 to successfully steal second base, he/she will earn a certain number of points. Bonus points may be awarded if for example the videogame player controls hero character 520 to slide into the correct portion of second base (typically the portion of second base furthest from home base) or the videogame player controls hero character 520 to start running to second base at an optimal time. The scoring is then stored (step 508). A running total of the scoring may be accumulated and maintained as the game play scenarios of the hero mode season are completed.

Figure 15:
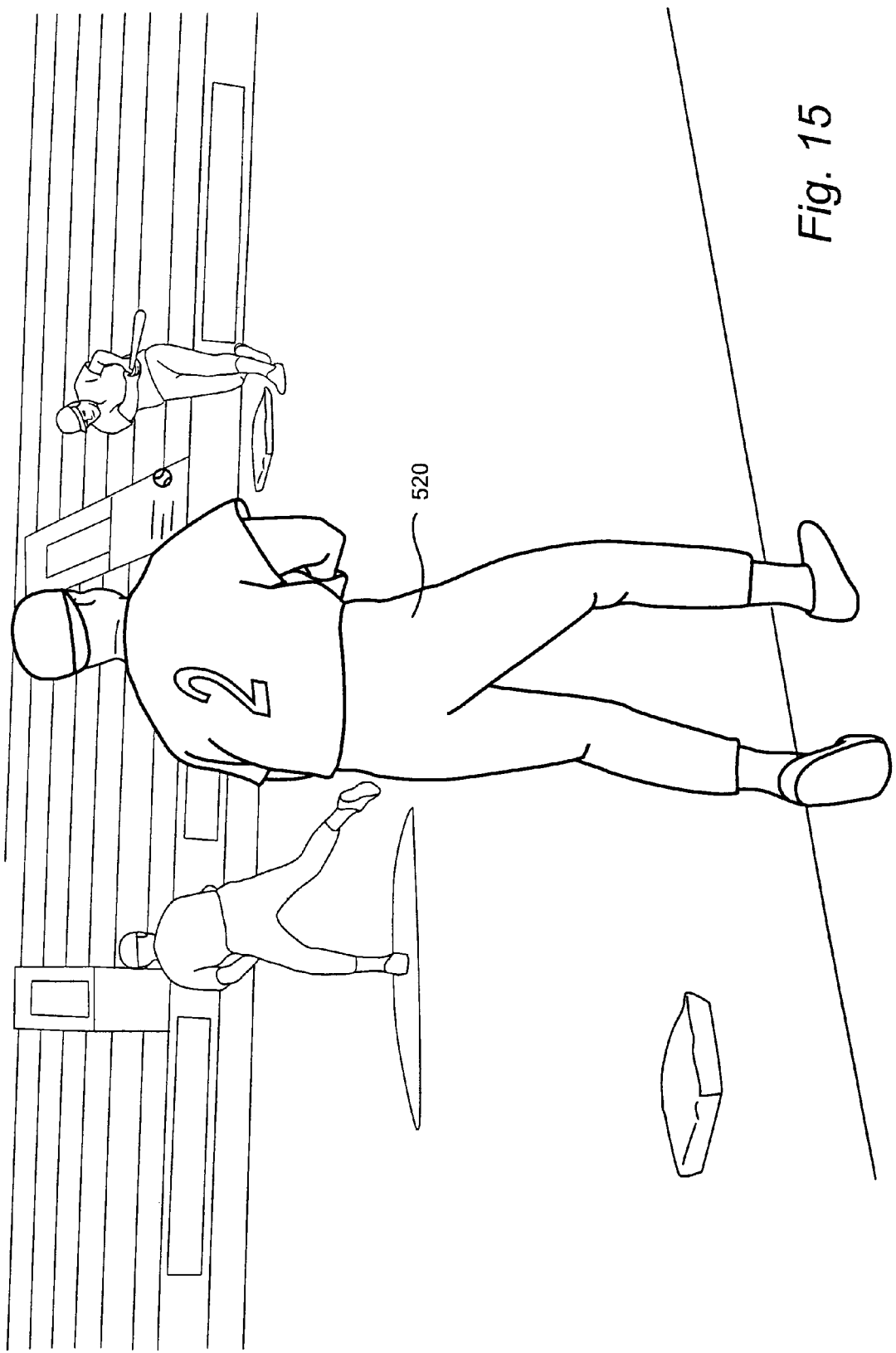
FIG. 15 is a screen shot of an exemplary non-limiting illustrative baseball videogame showing the hero videogame character waiting to field a hit as part of a second game play scenario of the hero mode season.
Figure 16:
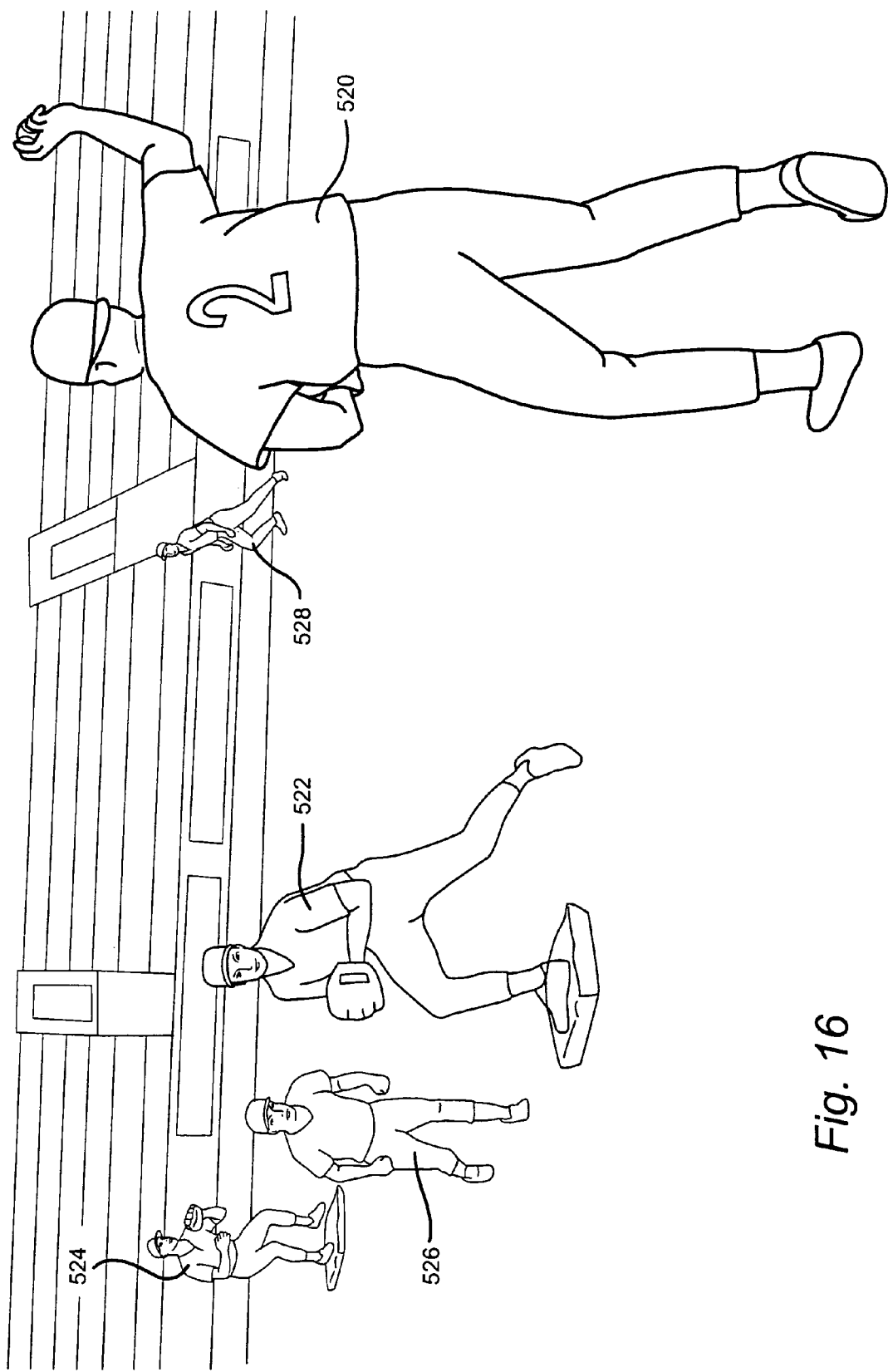
FIG. 16 is a screen shot of an exemplary non-limiting illustrative baseball videogame showing the hero videogame character attempting to complete a double play as part of the second game scenario of the hero mode season.

After the first game play scenario (in this example, a game play scenario in which the hero character attempts to steal second base as illustrated in FIGS. 13-14) and scores indicating how successful the videogame player was at satisfying the goal of the first game play scenario are stored, the videogame provides game play in a second scenario (step 510). FIGS. 15-16 illustrate an exemplary second game play scenario involving hero character 520 attempting to turn a double play. As illustrated in FIG. 15, the camera angle view shown in the display screen of FIG. 15 again originates from behind hero character 520 or alternatively from a first person perspective of hero character 520. As hero character 520 moves as shown in FIG. 16, the sound and objects in view change accordingly. For example, FIG. 16 shows hero character 520 having fielded an infield hit and moving toward second baseman 522 in an attempt to turn a double play to get base runners 526 and 528 out. While the objects in view change, the camera angle remains behind hero character 520. Also, as hero character 520 moves, the sound is also continually updated to play what would be heard by hero character 520. As an example, as hero character 520 moves toward second base, audio instructions from either second baseman 522 or first baseman 524 become louder.

As in the first game play scenario, the second game play scenario is scored to reflect how successful the videogame player was in controlling hero character 520 to accomplish the unique skill (in this game play scenario, turning a double play). As an example, ten points may be awarded to the videogame player if he/she controls the videogame character to successfully complete the double play. However, only five points may be awarded to the videogame player if only one of the two base runners 526 or 528 is put out. No points would be awarded to the videogame player if he/she controls hero character 520 so that neither of the base runners 526, 528 is put out. The score results may be stored (step 512) and added to the results from the first game play scenario.

The videogame then generates another game play scenario of the hero mode season. This game play scenario may, for example, test the videogame player to control hero character 520 to hit a home run, obtain a hit to drive home a winning run in the bottom of the ninth inning, bunt, or obtain an in-field hit. Points will be again awarded based upon the videogame player's ability to control hero character 520 to achieve the goal of the game play scenario presented. As yet another example, suppose the goal in the game play scenario is to hit a home run in the bottom of the ninth inning. If the videogame player is successful in controlling hero character 520 to hit a home run, the videogame player may be awarded ten points. If, however, the videogame player controls hero character 520 to hit only a double, the videogame character will only be awarded five points. The score will be stored and added to the scores of previous game play scenarios. This scoring is separate from runs scored during normal baseball game play. A game within the baseball game can thus be enjoyed by the videogame player.

Subsequent game play scenarios are presented to the videogame player until the last game play scenario has been completed (step 514). Scoring of a videogame player may be accumulated (step 516) after each game play scenario. At the conclusion of the last game play scenario, the accumulated score serves as a measure of how successfully the videogame player controlled the hero character to perform the character's unique abilities. This accumulated score can be compared to the score of other videogame players controlling the same hero character. The final accumulated score may also be compared to a threshold score level which determines whether the hero character, as controlled by the videogame player, has become the MVP of the league.

The hero mode thus provides a game within the baseball game having scoring that is not necessarily measured in runs, but reflects the videogame players ability to control hero character 520 to perform the character's unique skills. Rather than playing a lengthy 162 game season, the videogame player may thus enjoy the opportunity to perform the unique skills immediately. The videogame player will thus not have to wait to see, if at all, the scenarios would come up in regular game play. Moreover, since the camera angle view and audio continually reflect the perspective of the hero character, the videogame player may enjoy experiencing a simulation of what a corresponding real-life player would experience in an actual game. While the hero mode is discussed in the context of a baseball game, it will be appreciated that it may be incorporated into any other suitable sports videogame.

Figure 17:
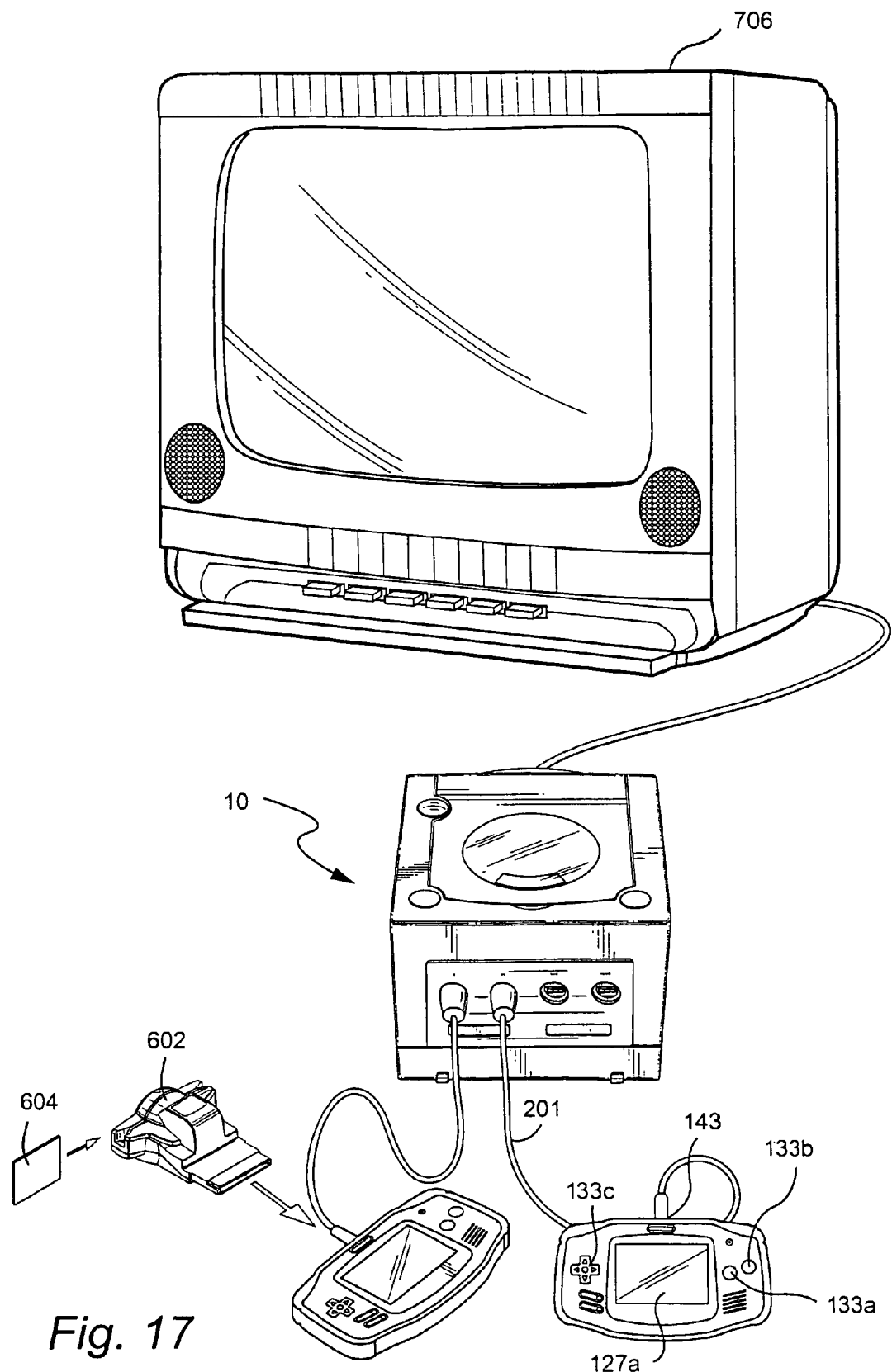
FIG. 17 shows an exemplary card reader connected to a portable game system (GBA) which serves as a controller in communication with a game console.

FIG. 17 shows a videogame being executed by console 10 which is controlled using one or more GBA controllers to enable a user to create an image and incorporate that image into a virtual sports venue such as a virtual stadium or arena for game play in accordance with another exemplary non-limiting implementation. Slot 240 of one or more of the GBA controllers is receives a card reader 602. Electronic card reader 602 such as the Nintendo e-reader unit is capable of reading cards 604 which may be swiped into a reading slot of card reader 602. Details of an exemplary card reader can be found in U.S. Patent Application Publication US-2002-0028710-A1 to Ishihara, the content of which is hereby incorporated by reference.

A program can be downloaded to and executed by a processor housed in one of the controllers (or alternatively executed by a processor in console 10). For example, a paint program may be downloaded to a controller either as a program portion of the videogame software encoded in the storage disk received by game console 10 or from a memory device housed in a cartridge inserted into slot 240 of the controller. A paint program can alternatively be downloaded to the controller by scanning appropriate cards 604 through card reader 602. Execution of the paint program enables the user to create pixilated images which will be displayed as a part of a virtual sports venue to help define the atmosphere in which game play occurs. For example, portions of the sports venue on which the created images may be displayed include ads, billboards, signs, motion picture screens (jumbotron-type screens) and patterns on the playing field or court. Execution of the paint program thus provides a pixel art generator which the user can operate by appropriate manipulation of keys 133a-133g to create unique images. Predefined images may be downloaded from the software executed by game console 10 or by swiping a card 604 through card reader 602. The user can then edit or alter this downloaded image by operating keys 133a-133g of the controller to create a customized image. The pixilated image, whether originally created using the paint program, downloaded from card 604 via reader 602 or created by editing preexisting images, may be previewed in a preview mode in display screen 127a of the controller or the display of display device 706.

The pixilated images are processed by processor(s) in the controller and/or console 10. This processing includes converting the image into a texture. The texture is later imported and texture mapped onto a part of the virtual sports venue by a processor and graphics co-processor of console 10 so that the user created image may be shown as part of the venue in which interactive game play such as character action occurs during further execution of videogame software.

Figure 18:
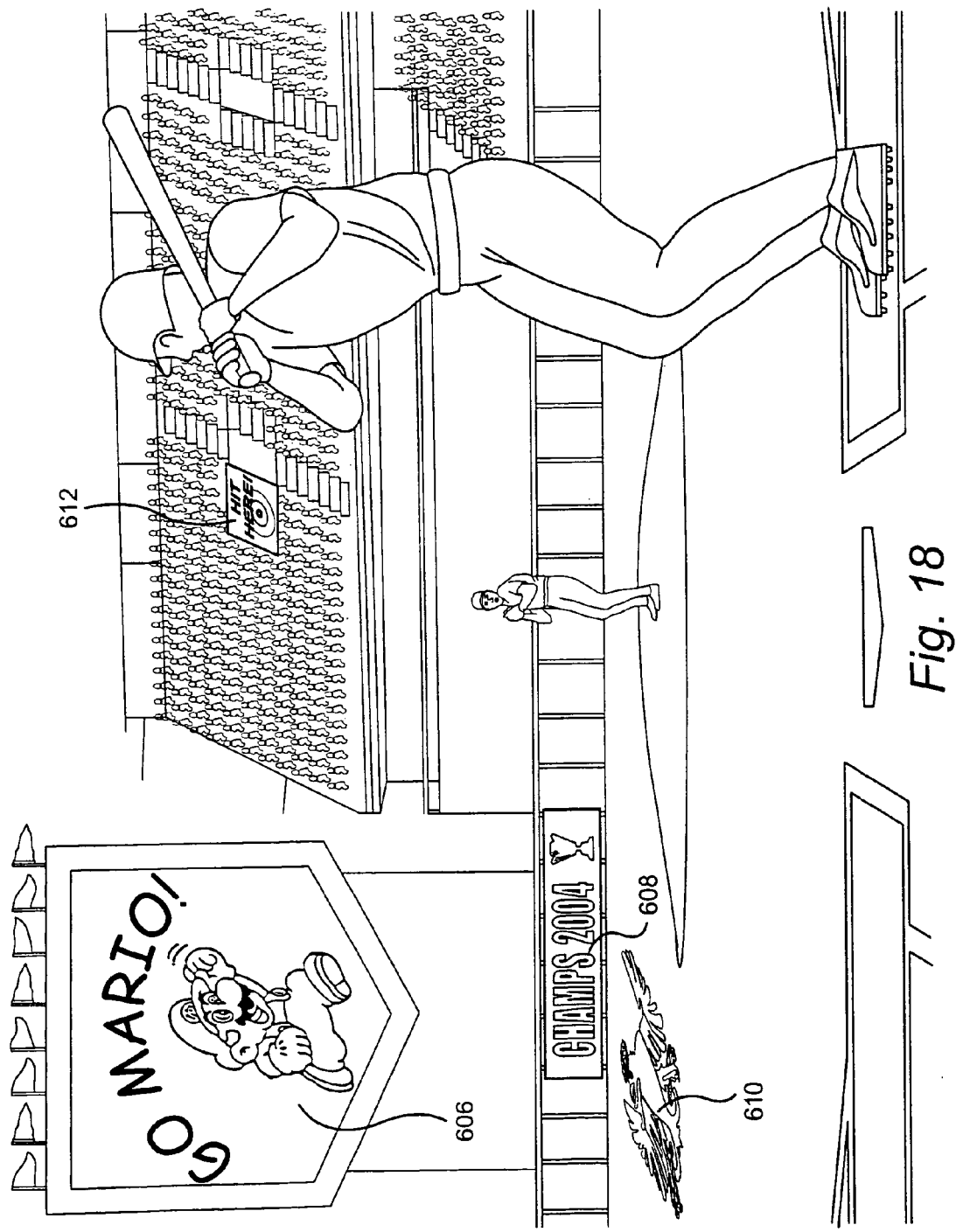
FIG. 18 is a screen shot of an exemplary non-limiting illustrative sports videogame which includes incorporating user generated images into a sports venue in which interactive game play occurs. The method of this videogame may be executed by any of the game systems illustrated in FIGS. 1-4 and 17.

FIG. 18 illustrates numerous examples of user created images that have been imported into the virtual sports venue in which interactive game play occurs. For example, user created images may be imported and texture mapped onto motion picture screen 606, stadium billboards or banners 608, signs 612 held by fans, and patterns 610 on the field (such as mowing patterns) or court itself. Once the images are mapped onto respective portions of the venue, the display of the images may be animated during game play. For example, images on motion picture screens 606 may be animated to simulate movement of the image. By allowing user generated pixel art to be imported onto the signs, billboards, banners, motion picture screens and/or playing surface, the mood of the fans and overall atmosphere of the venue in which game play occurs can be customized to the user's taste. A home-court or home-field atmosphere may thus be generated by the user. The user may also elect to change different colors such as the color of the clothing worn by the fans to create an even further customized atmosphere. By allowing the user to customize signs, banners, motion picture screens, billboards, fields and colors, greater interest in the videogame may be generated.

Figure 19:
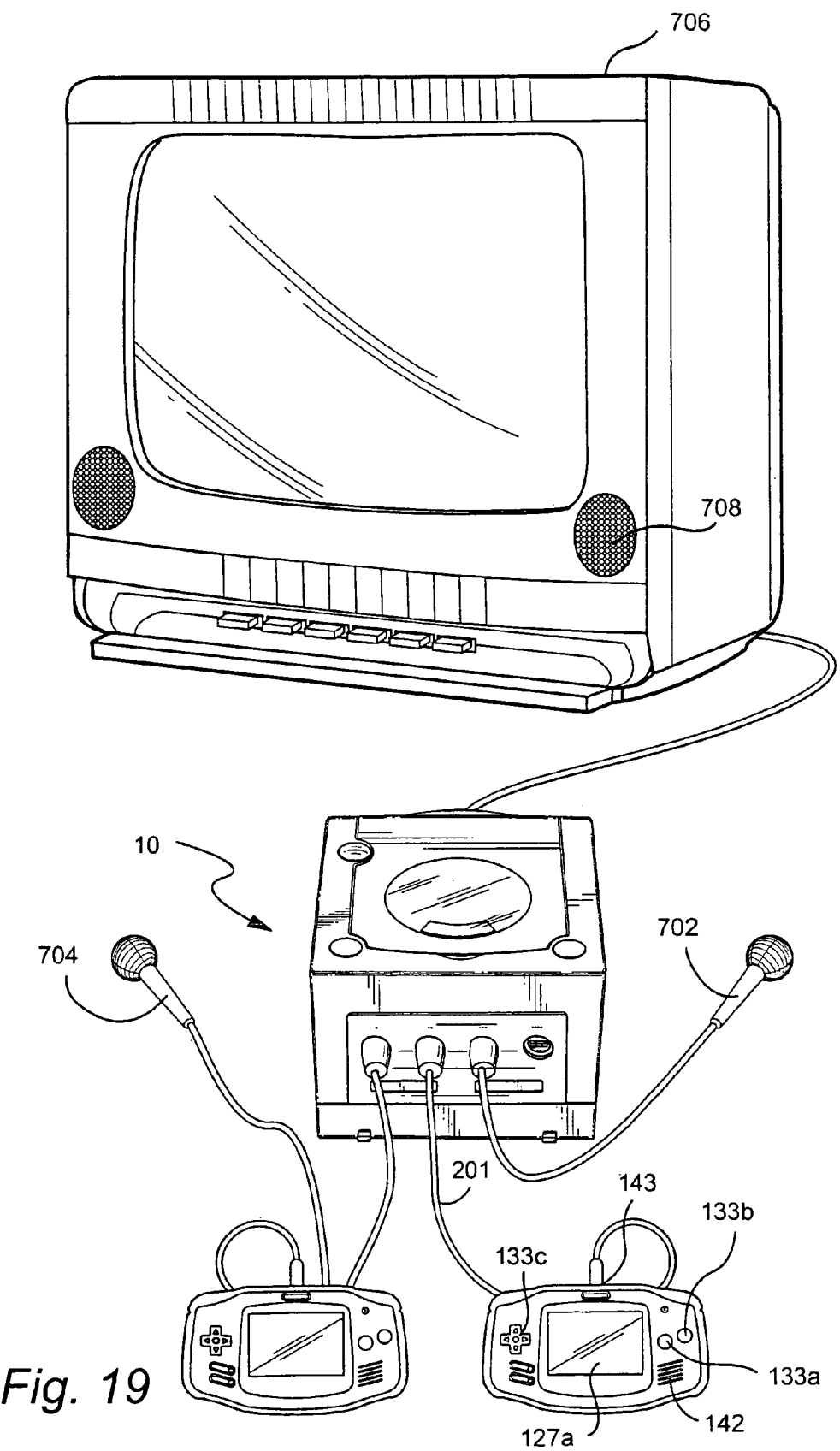
FIG. 19 shows microphones capable of receiving and transmitting audio signals from a user. The microphones can be in direct communication with the game console or a portable game system which serves as a controller to the game console.

In accordance with another exemplary non-limiting implementation, FIG. 19 shows a videogame system that executes a sports videogame which allows a user to incorporate one or more audio messages (e.g., message having the user's voice, music, sound effects, etc.) into game play of the videogame. A microphone 702 may be plugged into one of the connection ports 24 of game console 10 to receive audio messages. A microphone 704 may also be plugged into interface 143 or slot 240 of one or more of the controllers to receive audio messages. Alternatively, microphone 702 and/or 704 may communication wirelessly with the controller or console 10. The user inputs an audio message such as his/her own voice through microphone 702 or 704. The message is recorded and saved on a memory medium such as the videogame disk received by console 10 or other suitable storage medium for later use. Alternatively, the user may play his/her own voice or other audio messages live through the videogame via microphone 702 or 704.

During game play, the audio message may be played back as, for example, the virtual stadium public address (PA) announcer of the videogame. The user could thus record an announcement and introduction for a particular videogame character to be played when that character enters the game or record a rendition of the national anthem with background music provided by the videogame program to be played immediately before game play begins. Alternatively, the user may provide announcements, introductions, songs or his/her own play-by-play color commentary live during game play.

Figure 20:
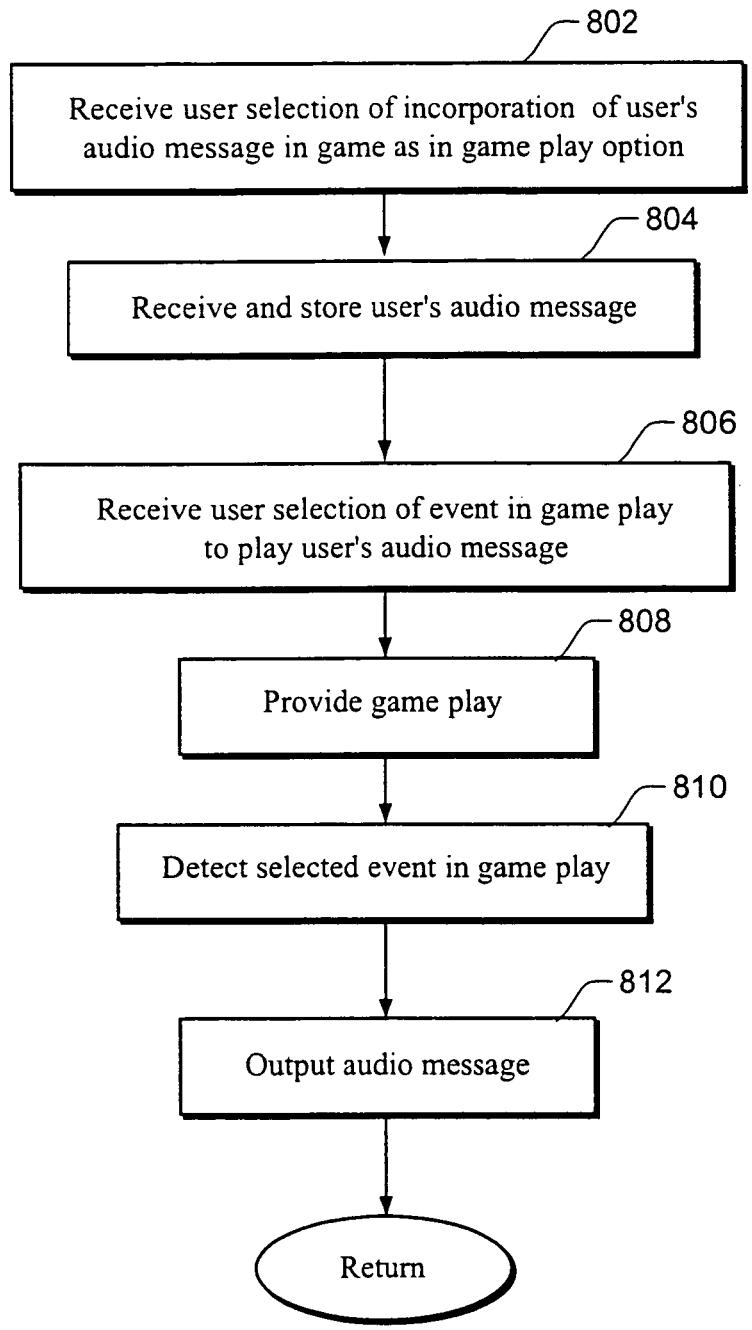
FIG. 20 is a flow diagram illustrating a method of a sports videogame which includes incorporation of a user's audio message in the videogame. This method of this sports videogame may be executed by, for example, the game system illustrated in FIG. 19.

FIG. 20 illustrates an exemplary non-limiting implementation of incorporating a recorded audio message such as a message having the user's voice into game play of the videogame. After the user selects the incorporation of a user's audio message into the videogame as a game play option (step 802), the user records his/her audio message (step 804). As an example, the user may record the audio message "Going, going, gone!" The message is stored on the disk received by game console 10 or other suitable storage device.

The user selects a game play event which will trigger the audio message to be played, for example, over the virtual PA system of the videogame during game play (step 806). The user's selection of the event may be facilitated through a menu display screen provided by the videogame which lists a plurality of different game play events which may occur in later game play. For example, assume that the user selected the game play event of hitting a home run from a menu display screen in a baseball videogame having many other possible game play events such as a bunt, double play, stolen base, etc.

The user can select a particular event from the list provided by the menu display screen, which may be shown on display device 706 or display 127*a*, through appropriate manipulation of the controller. The event selected by the user, in this case a home run, will be used to trigger the recorded message of "Going, going, gone!" to be played back through speaker 708 of display device 706 or speaker 142 of the controller.

After game play starts (step 808), the selected game play event may occur. Upon the detection of this game play event (step 810) by the videogame, the recorded audio message will be automatically played during game play (step 812). In the foregoing example, the videogame detects when a home run has been hit and automatically outputs the user's recorded audio message "Going, going, gone!" The user's voice can thus be incorporated into game play for a user selected event, thereby providing further user customization of game play.

While the above exemplary features describe in the context of a baseball videogame, the exemplary features can be implemented in any suitable sports videogame. While various implementations of technology are described above, it is to be understood that the invention is not to be limited to the disclosed implementations, but on the contrary, is intended to cover various modifications and equivalent arrangements included within the spirit and scope of the appended claims.

What is claimed is:

1. In a videogame system including a player-operable controller, a method comprising:

allowing a player to create an image using the player-operable controller during execution of a software program stored on a memory device of the videogame system, the software program executable by the videogame system to provide an interactive sports videogame configured to display one or more virtual game characters and a virtual sports venue;

allowing the player to select a portion of the virtual sports venue;

applying the player-created image onto the selected portion of the virtual sports venue;

displaying the virtual sports venue having the applied player-created image so that the player-created image contributes to the overall atmosphere in which interactive game play of the sports videogame is provided to the player, so that the one or more virtual game characters of the sports videogame controllable by the player in playing the sports videogame are located within the virtual sports venue, and so that the applied player-created image is applied to the selected portion of the virtual sports venue at a fixed virtual location, selected by the player, via the player-operable controller, from among a plurality of predefined virtual locations within the virtual sports venue, and as a part of the virtual sports venue, regardless of how the one or more virtual game characters within the sports venue are controlled during the interactive game play; and providing interactive game play of the sports videogame within the virtual sports venue in response to input received on the player-operable controller, such that the one or more virtual game characters are separate, and separated and distinct from, the virtual sports venue in which the one or more virtual game characters play;

wherein selection of the portion of the virtual sports venue is independent of any player control of the one or more virtual game characters; and wherein (a) the image is created by editing a preexisting image that is loaded into the videogame system by reading data from a card with a card reader, or (b) applying the player-created image onto the portion of the virtual sports venue includes processing the player-created image to convert the player-created image into a texture and texture mapping the texture onto the selected portion of the virtual sports venue at the fixed virtual location.

2. The method of claim 1 wherein the virtual sports venue is a stadium and the selected portion of the virtual sports venue onto which the player-created image is applied is a stadium billboard.

3. The method of claim 1 wherein the card reader is connected to the player-operable controller.

4. The method of claim 1 further comprising allowing the player to preview the player-created image, before application onto the selected portion of the virtual sports venue, on a display screen of the player-operable controller.

5. The method of claim 1 further comprising animating the selected portion of the virtual sports venue onto which the created image is applied so that a moving picture is simulated.

6. The method of claim 1 wherein the execution of the software program is accomplished at least in part by a processor arranged within the player-operable controller.

7. The method of claim 1 wherein the selected portion of the virtual sports venue onto which the player-created image is applied is a playing surface area on which the one or more virtual game characters are located.

8. The method of claim 1 wherein the player-created image contributes to the overall atmosphere in which interactive game play of the sports videogame so that a home-court or home-field is provided.

9. The method of claim 1 wherein the player-created image is applied directly to the virtual sports venue without regard to movement of the one or more virtual game characters of the sports videogame.

10. The method of claim 1 further comprising:

receiving audio input from the player;

receiving from the player an indication of an event within the interactive game play of the sports videogame that is to trigger reproduction of the audio;

reproducing the audio in response to the event occurring within the interactive game play of the sports videogame.

11. A system for playing a sports videogame comprising:

a player-operable controller configured to receive input from a player; and at least one processor that communicates with the player-operable controller and executes a software program, the software program providing a sports videogame configured to display one or more virtual game characters and a virtual sports venue so that at least the following can be performed:

allowing a player to create an image using the player-operable controller;

allowing the player to select a virtual location from among a plurality of predefined locations of the virtual sports venue;

applying the player-created image onto the selected location, selected by the player via the player-operable controller, of the virtual sports venue as a part of the virtual sports venue, independent of one or more virtual game characters of the sports videogame that are player-controllable during the interactive game play;

displaying the virtual sports venue having the applied player-created image so that the player-created image contributes to the overall atmosphere in which interactive game play of the sports videogame is provided to the player, so that one or more virtual game characters of the sports videogame controllable by the player in playing the sports videogame are located within the virtual sports venue; and providing the interactive game play of the sports videogame within the virtual sports venue in response to input received on the player-operable controller, such that the one or more virtual game characters are separate, and separated and distinct from, the virtual sports venue in which the one or more game characters play;

wherein selection of the virtual location of the virtual sports venue is independent of any player control of the one or more game characters; and wherein (a) the image is created by editing a preexisting image that is loaded into the videogame system by reading data from a card with a card reader, or (b) applying the player-created image onto the portion of the virtual sports venue includes processing the player-created image to convert the player-created image into a texture and texture mapping the texture onto the selected virtual location of the virtual sports venue.

12. The system of claim 11 wherein the virtual sports venue is a stadium and the virtual location of the virtual sports venue onto which the player-created image is applied is a stadium billboard.

13. The system of claim 11 wherein execution of the software program by the processor includes downloading a program portion of the sports videogame to the player-operable controller for execution by a processor within the controller, the program portion executed by the processor within the controller allowing the player to create the image using the player-operable controller.

14. The system of claim 11 wherein the card reader is connected to the controller for reading the card and providing image data which may be edited by input on the player-operable controller to allow the player to create the image using the player-operable controller.

15. The system of claim 11 wherein the player-operable controller includes a display that shows a preview of the player-created image.

16. The system of claim 11 wherein the player can edit the preexisting image using the player-operable controller.

17. The system of claim 11 further comprising animating the virtual location of the virtual sports venue onto which the player-created image is applied so that a moving picture is simulated.

18. The system of claim 11 wherein the selected virtual location of the virtual sports venue onto which the player-created image is applied is a playing surface area on which the one or more virtual game characters are located.

19. The system of claim 11 wherein the player-created image contributes to the overall atmosphere in which interactive game play of the sports videogame so that a home-court or home-field is provided.

20. The system of claim 11 wherein the player-created image is applied directly to the virtual sports venue without regard to movement of the one or more virtual game characters of the sports videogame.

21. The system of claim 11 wherein the player-created image is applied to a fixed virtual location within the virtual sports venue.

22. A non-transitory computer readable storage medium tangibly storing instructions executable by a computer to control game play in a sports videogame configured to display one or more virtual game characters and a virtual sports venue, wherein the player interactively controls the one or more virtual game characters in the virtual sports venue using a player-operable controller, the instructions carrying out functionality comprising:

allowing a player to create an image using the player-operable controller;

allowing the player to select a portion of the virtual sports venue;

applying the player-created image onto a portion of the virtual sports venue, the portion being selected by the player, via the player-operable controller, from among a plurality of predefined locations;

controlling a non-player controlled virtual game character of the sports videogame;

receiving player input from the player-operable controller requesting an animated action be performed by the one or more virtual game characters; and displaying the performance of the animated action within the virtual sports venue having the applied, player-created image so that the player-created image is fixed therein as a part of the virtual sports venue and contributes to the overall atmosphere in which the animated action is performed, so that the one or more game characters are located within the virtual sports venue and are separated and distinct from the virtual sports venue;

wherein selection of the portion of the virtual sports venue is independent of any player control of the game characters; and wherein (a) the image is created by editing a preexisting image that is loaded into the videogame system by reading data from a card with a card reader, or (b) applying the player-created image onto the selected portion of the virtual sports venue includes processing the player-created image to convert the player-created image into a texture and texture mapping the texture onto the selected portion of the virtual sports venue.

23. The computer readable storage medium of claim 22 wherein the virtual sports venue is a stadium and the selected portion of the virtual sports venue onto which the player-created image is applied is a stadium billboard.

24. The computer readable storage medium of claim 22 wherein the card reader is connected to the player-operable controller.

25. The computer readable storage medium of claim 22 wherein further instructions are provided to enable the player to preview the player-generated image on a display screen housed within the player-operable controller.

26. The computer readable storage medium of claim 22 wherein further instructions are provided to animate the selected portion of the virtual sports venue onto which the player-created image is applied so that a moving picture is simulated.

27. The computer readable medium of claim 22 wherein the selected portion of the virtual sports venue onto which the player-created image is applied is a playing surface area on which the one or more virtual game characters are located.

28. The computer readable medium of claim 22 wherein the player-created image contributes to the overall atmosphere in which interactive game play of the sports videogame so that a home-court or home-field is provided.

29. The computer readable storage medium of claim 22 wherein the player-generated image is applied directly to the sports venue without regard to movement of the one or more virtual game characters of the sports videogame.

30. The computer readable storage medium of claim 22 wherein the player-created image is applied to a fixed virtual location within the selected portion of the virtual sports venue.

* * * * *